United States Patent
Ikeda

(10) Patent No.: US 11,237,739 B2
(45) Date of Patent: Feb. 1, 2022

(54) MEMORY SYSTEM

(71) Applicant: Toshiba Memory Corporation, Tokyo (JP)

(72) Inventor: Yoshitaka Ikeda, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 65 days.

(21) Appl. No.: 16/450,972

(22) Filed: Jun. 24, 2019

(65) Prior Publication Data
US 2020/0073563 A1 Mar. 5, 2020

(30) Foreign Application Priority Data

Sep. 5, 2018 (JP) .............................. JP2018-165904

(51) Int. Cl.
*G06F 3/00* (2006.01)
*G06F 3/06* (2006.01)

(52) U.S. Cl.
CPC .......... *G06F 3/0625* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,395,445 B1 | 7/2008 | Ramsay et al. | |
| 7,765,415 B2 | 7/2010 | Ishikura et al. | |
| 8,605,304 B2 | 12/2013 | Yanazume et al. | |
| 2018/0081414 A1* | 3/2018 | Kojima | G06F 11/2015 |
| 2021/0126130 A1* | 4/2021 | Yamazaki | H01L 29/786 |

FOREIGN PATENT DOCUMENTS

JP 5655323 B2 1/2015

* cited by examiner

*Primary Examiner* — Midys Rojas
(74) *Attorney, Agent, or Firm* — Kim & Stewart LLP

(57) ABSTRACT

A memory system includes a nonvolatile memory and a controller configured to control the nonvolatile memory. The controller includes a processor, a storage circuit including a plurality of rewritable storage circuits that store timing data of a first timing information group which is settable by the processor, and a power source control circuit configured to trigger parallel execution of a plurality of power source control functions according to the timing data of the first timing information group read from the storage circuit.

17 Claims, 13 Drawing Sheets

FIG. 8

| POWER SAVE MODE | PM_RY2 | PM_PRG0 |
|---|---|---|
| CLR_BE_CLK_EN | 0 | 0 |
| CLR_FE_CLK_EN | 0 | 0 |
| SET_VA2_SRAM_RET | 2 | 55 |
| SET_VA2_ISO | 3 | 55 |
| SET_OEZ_CTL | 3 | 55 |
| CLR_VA2_RST_X | 4 | 1 |
| CLR_EXPAND_VA2_RST_X | 4 | 55 |
| CLR_VA2_RETFF_RST_X | 4 | 55 |
| CLR_VREF_EN | 4 | 4 |
| CLR_NOS_EN | 4 | 2 |
| CLR_DCC_IP_EN | 4 | 55 |
| SET_VA2_PDN_EN | 5 | 5 |
| CLR_VA2_PDN_EN | 22 | 55 |

INF2_RY2    INF1_PRG0

FIG. 11

| POWER SAVE MODE | PM_RY2 | PM_PRG0 |
|---|---|---|
| SET_NAND_PMODE | 0 | 0 |
| SET_SRAM1A_PUP_EN | 0 | 0 |
| CLR_CROSC_ASYNC_CLR | 1 | 1 |
| SET_DOSC_EN | 13 | 44 |
| CLR_SRAM1A_PUP_EN | 13 | 13 |
| SET_SRAM1B_PUP_EN | 18 | 58 |
| CLR_SRAM1B_PUP_EN | 39 | 79 |
| SET_SRAM2_PUP_EN | 39 | 79 |
| CLR_SRAM2_PUP_EN | 65 | 105 |
|  | INF2_RY2 | INF1_PRG0 |

MEMORY SYSTEM

CROSS-REFERENCE TO RELATED APPLICATION

This application is based upon and claims the benefit of priority from Japanese Patent Application No. 2018-165904, filed Sep. 5, 2018, the entire contents of which are incorporated herein by reference.

FIELD

Embodiments described herein relate generally to a memory system.

BACKGROUND

A memory system executes a power source control function to switch among a plurality of power source states. In such a memory system, it is desirable to implement a power source control function that can flexibly accommodate changes to a product specification in the area of power source control.

DESCRIPTION OF THE DRAWINGS

FIG. 8 is a diagram illustrating an example of timing information regarding a power down process in the embodiment.

FIG. 11 is a diagram illustrating an example of timing information regarding a wake-up process in the embodiment.

DETAILED DESCRIPTION

Figure 1:
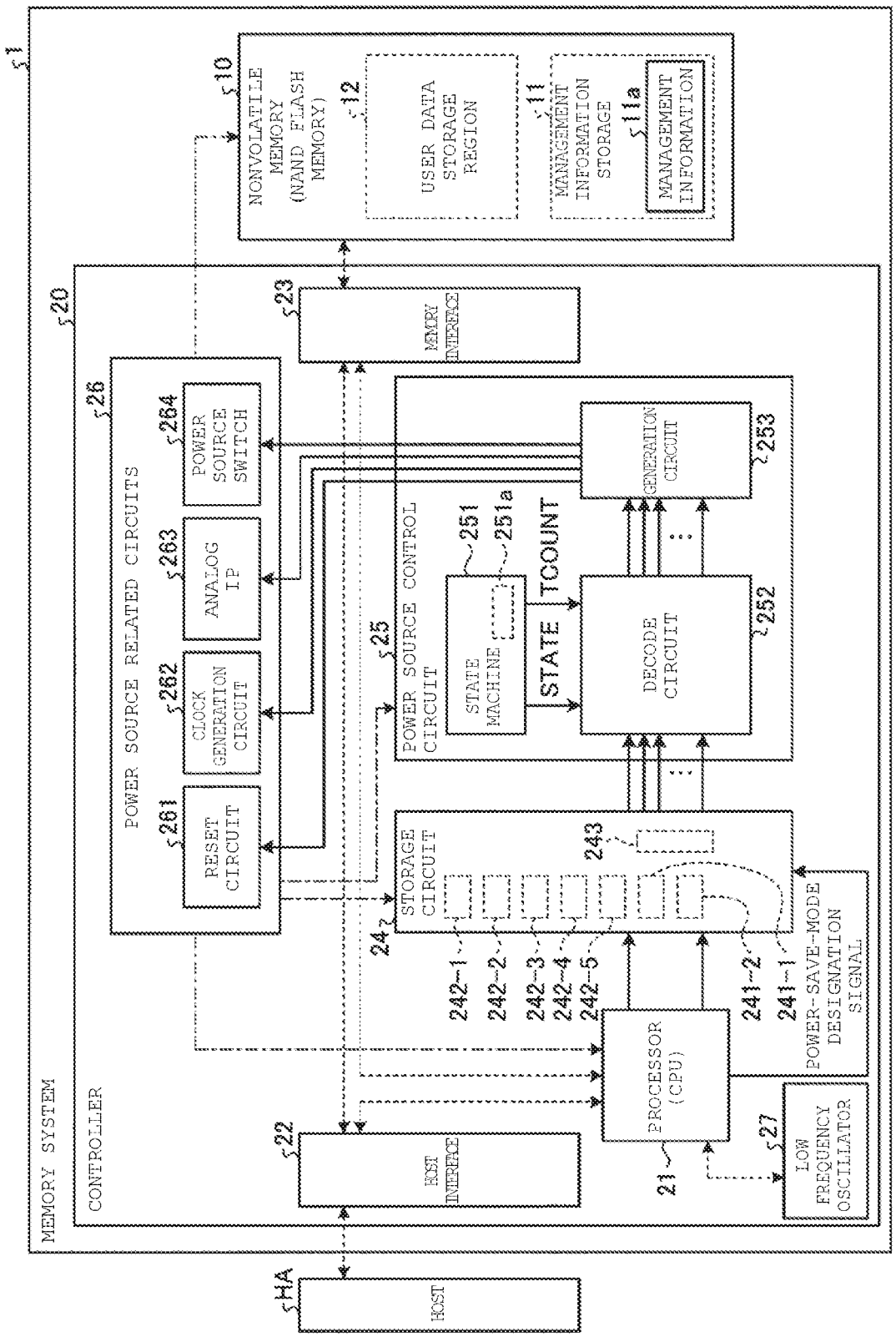
FIG. 1 is a diagram illustrating a configuration of a memory system according to an embodiment.

Embodiments provide a memory system capable of flexibly accommodating a specification change regarding a power source control function.

In general, according to one embodiment, there is provided a memory system including a nonvolatile memory and a controller configured to control the nonvolatile memory. The controller includes a processor, a storage circuit including a plurality of rewritable storage circuits that store timing data of a first timing information group which is settable by the processor, and a power source control circuit configured to trigger parallel execution of a plurality of power source control functions according to the timing data of the first timing information group read from the storage circuit.

Hereinafter, with reference to accompanying drawings, a memory system according to an embodiment will be described in detail. The invention is not limited to the embodiment disclosed herein.

Embodiment

A memory system according to the embodiment can change the power source state among a plurality of power source states. The memory system has a plurality of power save modes. In the plurality of power save modes, transitioning among the plurality of power source states may differ depending on requirements of a product specification, and the state after transitioning may also differ. The memory system, which executes multifunction, is required to execute a plurality of power source control functions in controlling the transitions among power source states.

The plurality of power source states includes not only a power up state (that is, an active state) but also a power off state (that is, a shutdown state) or a power down state. Thus, it is desirable to execute a plurality of power source control functions at a high speed and with low power consumption even when an available power source or a clock is limited. Therefore, in the memory system, a hardware state machine controls the transitions among the plurality of power source states.

For example, in a case where a plurality of power source control functions are controlled by the state machine, a plurality of states of the state machine corresponding to the plurality of power source control functions may be provided, and transitioning among the respective states may be controlled by the state machine. In this case, the state machine may be configured such that each power source control function is correlated with each state of the state machine, and each state is transitioned for executing a necessary function corresponding to each power save mode. For example, a plurality of states for respective functions are provided from a first power source state (for example, an active state) to a second power source state (for example, a power down state) and a process for each function is performed in each state.

In such a configuration, since the number of states or the number of routes of state transition tends to be large, a configuration and an operation of the state machine are likely to be complex, and the time required for verification of a design of the memory system is likely to be increased. When the number of states is changed or a state transition route is changed in accordance with a product specification being changed, the number of steps for revising the hardware of the memory system is likely to be increased. In a case where there is a bug or a product specification change after hardware is manufactured, manufacturing cost is likely to increase.

Therefore, in the present embodiment, in the memory system, states are simplified to correspond to a few power source states, and a timing information group corresponding to a plurality of power source control functions is provided such that the timing information group can be set by firmware. The timing information group can be changed as appropriate, and thus the timing information group can be defined flexibly.

Here, the timing information group is information regarding a plurality of power source control functions for each power source state. Since the states are simplified to correspond to a few power source states, information regarding each power source control function is divided into timing information and control content information. The timing information defines a timing at which the power source control function is operated. The control content information defines an operation content of the power source control function (for example, a name of signal to be generated or an operation of a signal such as changing from an H level to an L level). An operation timing of each power source control function can be changed by changing the timing information.

Specifically, a memory system 1 may be configured as illustrated in FIG. 1, which is a diagram illustrating a configuration of the memory system 1.

The memory system 1 is connected to a host HA via a communication bus, and functions as an external storage device for the host HA. The memory system 1 is, for example, a flash memory or a solid state drive (SSD). The host HA is, for example, a personal computer, a CPU core, a mobile phone, or an imaging apparatus.

The memory system 1 includes a nonvolatile memory 10 and a controller 20. The controller 20 may be mounted as a controller package including, for example, a system-on-a-chip (SoC).

The nonvolatile memory 10 is disposed outside the controller 20, and may be mounted as a nonvolatile memory package. The nonvolatile memory 10 may be, for example, a NAND flash memory, but is not limited thereto. The nonvolatile memory 10 may be, for example, a resistance random access memory (ReRAM), a phase change RAM (PRAM), a magnetoresistive random access memory (MRAM), or a ferroelectric random access memory (FeRAM).

In a case where the nonvolatile memory 10 is a NAND flash memory, the nonvolatile memory 10 has a memory cell array in which a plurality of memory cells are arranged in a matrix form. Each memory cell can store multi-values, and thus a plurality of pages can be stored in a group of memory cells. The nonvolatile memory 10 is arranged as a plurality of blocks each of which is a data erase unit. Some of the blocks are allocated to a management information storage region 11, and the other blocks are allocated to a user data storage region 12. Management information 11a such as information designating a power save mode and information regarding a set timing information group is written into the management information storage region 11 during shipment. User data is written in the user data storage region 12. Each block is made up of a plurality of pages. Each page is a data write and read unit. The nonvolatile memory 10 includes, for example, a plurality of memory chips.

The controller 20 includes a processor 21, a host interface 22, a memory interface 23, a storage circuit 24, a power source control circuit 25, power source related circuits 26, and a low frequency oscillator 27.

The processor 21 is, for example, a central processing unit (CPU), and controls each portion of the controller 20. The processor 21 executes firmware FW, and performs a control operation according to the firmware FW. For example, the processor 21 controls reading of data from the nonvolatile memory 10 in response to a read request from the host HA. The processor 21 controls writing of data into the nonvolatile memory 10 in response to a write request from the host HA.

The host interface 22 is an interface for connection to the host HA. In a case where a request (for example, a read request or a write request) is received from the host HA, the host interface 22 transmits the received request to the processor 21 and/or the memory interface 23.

The memory interface 23 is an interface for connection to the nonvolatile memory 10. The memory interface 23 may perform control of access to the nonvolatile memory 10 by issuing a command in response to a request from the host HA or the processor 21, and supplying the command to the nonvolatile memory 10.

The storage circuit 24 includes, for example, a register and a hard-wired circuit, and stores a plurality of timing information groups. The plurality of timing information groups respectively correspond to a plurality of power save modes. Each timing information group includes a plurality of timing information sets. In each timing information group, contents of at least some pieces of timing information may be different from each other among a plurality of pieces of timing information. The plurality of timing information groups include a plurality of timing information groups INF1 and a plurality of timing information groups INF2.

Each timing information group INF1 includes a plurality of settable timing information sets. Timing information in each settable timing information set is rewritable by the processor 21 by executing the firmware FW.

Each timing information group INF2 includes a plurality of fixed timing information sets. Timing information in each fixed timing information set is not rewritable by the processor 21 by executing the firmware FW.

Figure 2:
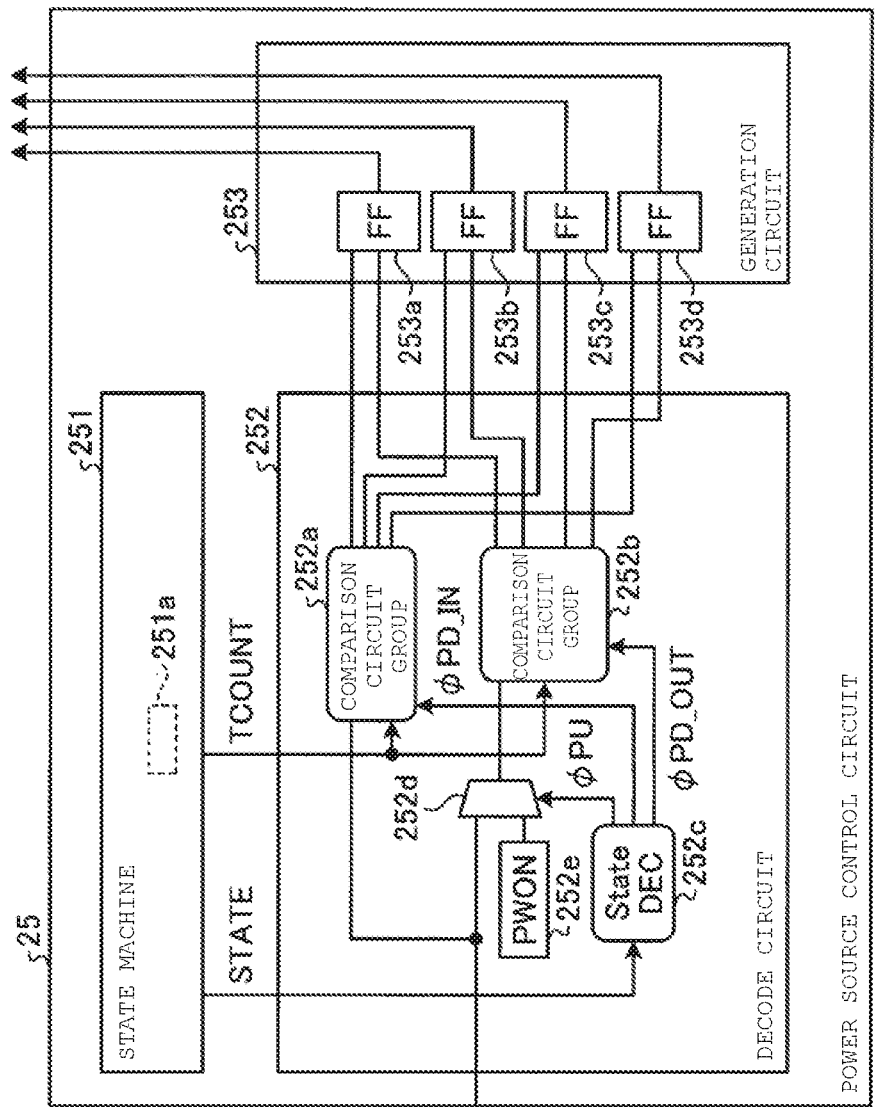
FIG. 2 is a diagram illustrating configurations of a storage circuit and a power source control circuit in the embodiment.

For example, as illustrated in FIG. 2, the storage circuit 24 includes a plurality of first circuits 241-1 and 241-2 corresponding to the plurality of timing information groups INF1, a plurality of second circuits 242-1 to 242-5 corresponding to the plurality of timing information groups INF2, and a selector circuit 243. FIG. 2 is a diagram illustrating configurations of the storage circuit 24 and the power source control circuit 25. Each circuit 241 stores the timing information groups INF1 in a rewritable manner. Each circuit 242 stores the timing information groups INF2 in a fixed manner.

The plurality of timing information groups INF1 each include the same number of bits. The plurality of timing information groups INF2 each include the same number of bits. The timing information groups INF1 and the timing information groups INF2 include the same number of bits. Consequently, a bit width of a line via which each circuit 241 is connected to the selector circuit 243 is equivalent to the number of bits of the timing information groups INF1. A bit width of a line via which each circuit 242 is connected to the selector circuit 243 is equivalent to the number of bits of the timing information groups INF2. A bit width of a line via which the selector circuit 243 is connected to the power source control circuit 25 is equivalent to the number of bits of the timing information groups INF1, and is equivalent to the number of bits of the timing information groups INF2.

The first circuit 241-1 includes a register PRG0 storing a timing information group INF1_PRG0. The first circuit 241-2 includes a register PRG1 storing a timing information group INF1_PRG1. The processor 21 can store or rewrite the timing information groups INF1_PRG0 and INF1_PRG1 by accessing each of the register PRG0 and the register PRG1. The number of bits of information which can be stored in each of the register PRG0 and the register PRG1 corresponds to the number of bits of the timing information group INF1.

Figure 3:
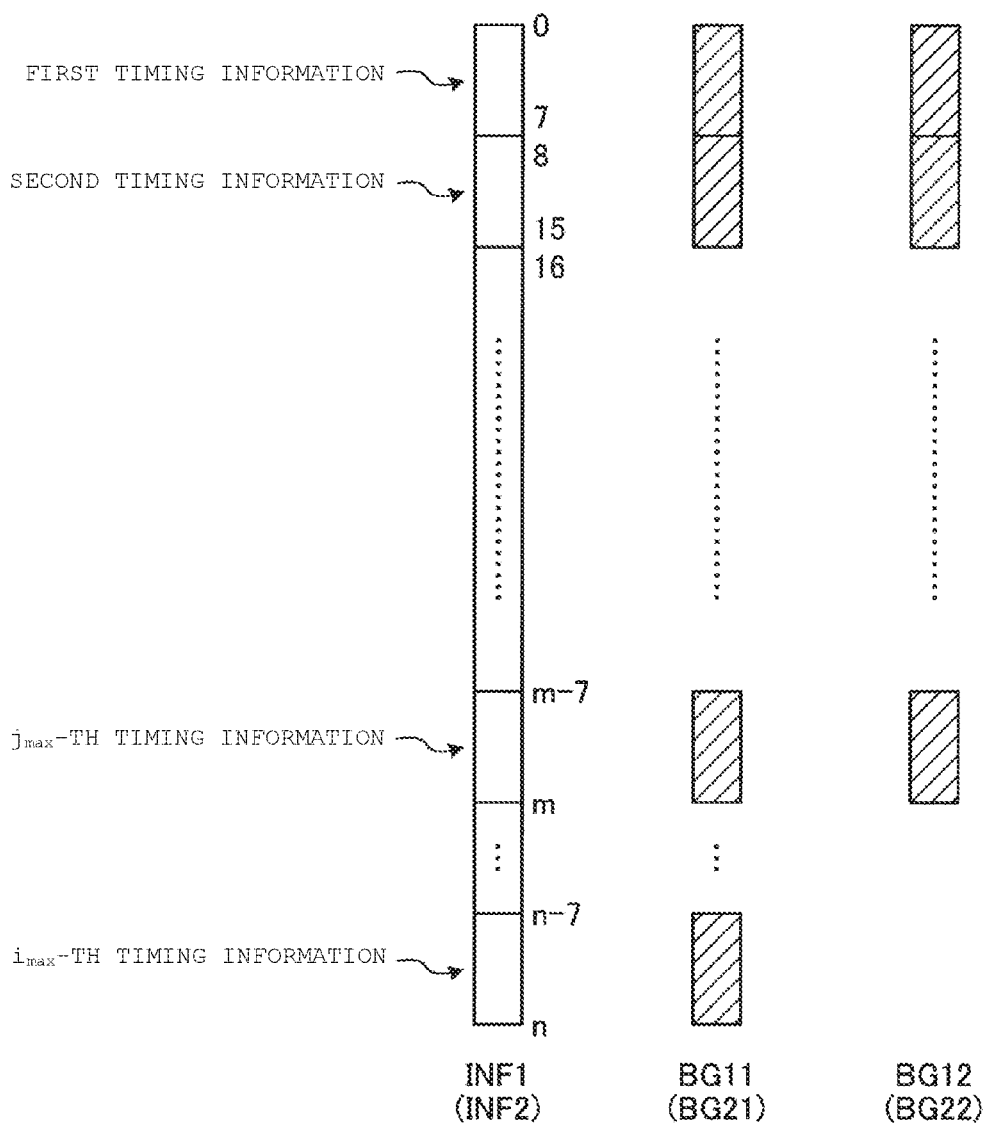
FIG. 3 is a diagram illustrating a data structure of a timing information group in the embodiment.

The timing information groups INF1 includes a plurality of bit groups corresponding to a plurality of power source states of the memory system 1. For example, as illustrated in FIG. 3, the timing information groups INF1 includes a bit group BG11 and a bit group BG12. FIG. 3 is a diagram illustrating data structures of the timing information groups INF1 and INF2. The bit group BG11 and the bit group BG12 may be differentiated from each other according to bit positions in the timing information groups INF1. A value indicated by a bit string (for example, a value indicated by 8 bits) of each piece of timing information in the bit group BG11 indicates a timing at which a corresponding first power source control function is executed. A value indicated by a bit string (for example, a value indicated by 8 bits) of each piece of timing information in the bit group BG12 indicates a timing at which a corresponding second power source control function is executed.

The bit group BG11 includes a plurality of pieces of timing information corresponding to a plurality of first power source control functions executed in a power down process in which a first power source state (for example, an active state) is transitioned to a second power source state (for example, a power down state). The plurality of pieces of timing information corresponding to the plurality of first power source control functions may be differentiated from each other according to bit positions in the bit group BG11. For example, as illustrated in FIG. 3, a bit string of 8 bits=1 byte corresponds to a single first power source control function. A bit string of i-th (where $1 \leq i \leq i_{max}$) timing information is stored in the $((i-1) \times 8)$-th bit to an $((i-1) \times 8+7)$-th bit in the timing information groups INF1. The number of bits of the bit group BG11 is $i_{max} \times 8$. As described above, a value indicated by a bit string (for example, a value indicated by 8 bits) of each piece of timing information indicates a timing at which a corresponding first power source control function.

The bit group BG12 includes a plurality of pieces of timing information corresponding to a plurality of second power source control functions executed in a wake-up process in which the second power source state (for example, a power down state) is transitioned to the first power source state (for example, an active state). The plurality of pieces of timing information corresponding to the plurality of second power source control functions may be differentiated from each other according to bit positions in the bit group BG12. For example, as illustrated in FIG. 3, a bit string of 8 bits=1 byte corresponds to a single second power source control function. A bit string of j-th (where $1 \leq j \leq j_{max}$) timing information is stored in the $((j-1) \times 8)$-th bit to a $((j-1) \times 8+7)$-th bit in the timing information groups INF1. The number of bits of the bit group BG12 is $j_{max} \times 8$. As described above, a value indicated by a bit string (for example, a value indicated by 8 bits) of each piece of timing information indicates a timing at which a corresponding second power source control function is executed. Some of the plurality of bit strings in the bit group BG12 are common to that in the bit group BG11.

The second circuit 242-1 is a hard-wired circuit, and includes a line group RY2 connected to a fixed potential corresponding to a timing information group INF2_RY2. The fixed potential may be a power source potential in a case of corresponding to a bit value "1", and may be a ground potential in a case of corresponding to a bit value "0". The second circuit 242-2 is a hard-wired circuit, and includes a line group RY1 connected to a fixed potential corresponding to a timing information group INF2_RY1. The second circuit 242-3 is a hard-wired circuit, and includes a line group RY1A connected to a fixed potential corresponding to a timing information group INF2_RY1A. The second circuit 242-4 is a hard-wired circuit, and includes a line group STB connected to a fixed potential corresponding to a timing information group INF2_STB. The second circuit 242-5 is a hard-wired circuit, and includes a line group FREQ connected to a fixed potential corresponding to a timing information group INF2_FREQ. A bit width of each of the line groups RY2, RY1, RY1A, STB, and FREQ corresponds to the number of bits of the timing information groups INF2.

The timing information group INF2 includes a plurality of bit groups corresponding to a plurality of power source states of the memory system 1. The timing information group INF2 has the same data structure as that of the timing information group INF1. For example, as illustrated in FIG. 3, the timing information group INF2 includes a bit group BG21 and a bit group BG22. The bit group BG21 and the bit group BG22 may be differentiated from each other according to bit positions in the timing information group INF2. A value indicated by a bit string (for example, a value indicated by 8 bits) of each piece of timing information in the bit group BG21 indicates a timing at which a corresponding first power source control function is executed. A value indicated by a bit string (for example, a value indicated by 8 bits) of each piece of timing information in the bit group BG22 indicates a timing at which a corresponding second power source control function is executed.

The bit group BG21 includes a plurality of pieces of timing information corresponding to a plurality of first power source control functions executed in a power down process in which the first power source state (for example, an active state) is transitioned to the second power source state (for example, a power down state). The plurality of pieces of timing information corresponding to the plurality of first power source control functions may be differentiated from each other according to bit positions in the bit group BG21. For example, as illustrated in FIG. 3, a bit string of 8 bits=1 byte corresponds to a single first power source control function. A bit string of i-th (where $1 \leq i \leq i_{max}$) timing information is stored in the $((i-1) \times 8)$-th bit to an $((i-1) \times 8+7)$-th bit in the timing information groups INF2. The number of bits of the bit group BG21 is $i_{max} \times 8$. As described above, a value indicated by a bit string (for example, an 8-bit value) of each piece of timing information indicates a timing at which a corresponding first power source control function.

The bit group BG22 includes a plurality of pieces of timing information corresponding to a plurality of second power source control functions executed in a wake-up process in which the second power source state (for example, a power down state) is transitioned to the first power source state (for example, an active state). The plurality of pieces of timing information corresponding to the plurality of second power source control functions may be differentiated from each other according to bit positions in the bit group BG22. For example, as illustrated in FIG. 3, a bit string of 8 bits=1 byte corresponds to a single second power source control function. A bit string of j-th (where $1 \leq j \leq j_{max}$) timing information is stored in the $((j-1) \times 8)$-th bit to a $((j-1) \times 8+7)$-th bit in the timing information group INF2. The number of bits of the bit group BG22 is $j_{max} \times 8$. As described above, a value indicated by a bit string (for example, a value indicated by 8 bits) of each piece of timing information indicates a timing at which a corresponding second power source control function is executed. Some of the plurality of bit strings in the bit group BG22 are common to that in the bit group BG21.

In the selector circuit 243, output nodes of the respective circuits 241-1 and 241-2 corresponding to the timing information groups INF1 and output nodes of the respective circuits 242-1 to 242-5 corresponding to the timing information groups INF2 are electrically connected to an input side thereof, and the power source control circuit 25 is electrically connected to an output side thereof. The processor 21 may generate a power-save-mode designation signal and supply the power-save-mode designation signal to the selector circuit 243 according to a host request or when a predetermined condition is satisfied. The power-save-mode designation signal is a signal for designating a power save mode to be used among a plurality of power save modes of the memory system 1. The selector circuit 243 selects a circuit to be used from among the plurality of first circuits 241-1 and 241-2 and the plurality of second circuits 242-1 to 242-5 in response to the power-save-mode designation signal received from the processor 21, and connects the selected circuit to the power source control circuit 25.

In a case where the power-save-mode designation signal is PM_RY2, the selector circuit 243 selects the line group RY2, and connects the line group to the power source control circuit 25. Consequently, potentials of the respective lines in the line group RY2 are supplied to the power source control circuit 25 in parallel. In other words, values of the respective bits in the timing information group INF2_RY2 are supplied to the power source control circuit 25 in parallel.

In a case where the power-save-mode designation signal is PM_RY1, the selector circuit 243 selects the line group RY1, and connects the line group to the power source control circuit 25. Consequently, potentials of the respective lines in the line group RY1 are supplied to the power source control circuit 25 in parallel. In other words, values of the respective bits in the timing information group INF2_RY1 are supplied to the power source control circuit 25 in parallel.

In a case where the power-save-mode designation signal is PM_RY1A, the selector circuit 243 selects the line group RY1A, and connects the line group to the power source control circuit 25. Consequently, potentials of the respective lines in the line group RY1A are supplied to the power source control circuit 25 in parallel. In other words, values of the respective bits in the timing information group INF2_RY1A are supplied to the power source control circuit 25 in parallel.

In a case where the power-save-mode designation signal is PM_STB, the selector circuit 243 selects the line group STB, and connects the line group to the power source control circuit 25. Consequently, potentials of the respective lines in the line group STB are supplied to the power source control circuit 25 in parallel. In other words, values of the respective bits in the timing information group INF2_STB are supplied to the power source control circuit 25 in parallel.

In a case where the power-save-mode designation signal is PM_FREQ, the selector circuit 243 selects the line group FREQ, and connects the line group to the power source control circuit 25. Consequently, potentials of the respective lines in the line group FREQ are supplied to the power source control circuit 25 in parallel. In other words, values of the respective bits in the timing information group INF2_FREQ are supplied to the power source control circuit 25 in parallel.

In a case where the power-save-mode designation signal is PM_PRG0, the selector circuit 243 selects the register PRG0, and connects the line group to the power source control circuit 25. Consequently, values of the respective bits maintained in the register PRG0 are supplied to the power source control circuit 25 in parallel. In other words, values of the respective bits in the timing information group INF1_PRG0 are supplied to the power source control circuit 25 in parallel.

In a case where the power-save-mode designation signal is PM_PRG1, the selector circuit 243 selects the register PRG1, and connects the line group to the power source control circuit 25. Consequently, values of the respective bits maintained in the register PRG1 are supplied to the power source control circuit 25 in parallel. In other words, values of the respective bits in the timing information group INF1_PRG1 are supplied to the power source control circuit 25 in parallel.

The power source control circuit 25 illustrated in FIG. 1 may execute a plurality of power source control functions in parallel according to a timing information group supplied from the storage circuit 24. The power source control circuit 25 includes a state machine 251, a decode circuit 252, and a generation circuit 253.

The state machine 251 controls a plurality of power source states of the memory system 1. The state machine 251 may generate a state signal STATE and supply the state signal STATE to the decode circuit 252 according to a host request or when a predetermined condition is satisfied. The state machine 251 has a timing counter 251a. The timing counter 251a may start a count operation in response to completion of transitioning (for example, completion from a state ACT to PD_IN or completion of transitioning from PD to PD_OUT) between a plurality of power source states. The timing counter 251a may perform a count operation so as to generate a timing count value TCOUNT, and supply the timing count value TCOUNT to the decode circuit 252.

The decode circuit 252 may receive a plurality of pieces of timing information from the storage circuit 24 in parallel to each other, perform a decode process on the plurality of pieces of timing information in parallel, and supply the decoded results to the generation circuit 253 in parallel.

For example, as illustrated in FIG. 2, in the power source control circuit 25, the decode circuit 252 includes a comparison circuit group 252a corresponding to the bit groups BG11 and BG21, a comparison circuit group 252b corresponding to the bit groups BG12 and BG22, a state decoder (state DEC) 252c, a selector circuit 252d, and a circuit 252e.

The circuit 252e fixedly maintains a timing information group as a timing information group INF3. The circuit 252e is a hard-wired circuit, and includes a line group PWON connected to a fixed potential corresponding to the timing information group INF3. A bit width of the line group PWON corresponds to the number of bits of the timing information group INF3. The timing information group INF3 includes a plurality of pieces of timing information corresponding to a plurality of power source control functions which are common to a plurality of power save modes executed in transitioning from a third power source state (for example, a shutdown state) to the first power source state (for example, an active state). Each piece of timing information indicates a timing count value at which a pulse corresponding to each power source control function is to be output.

Figure 4:
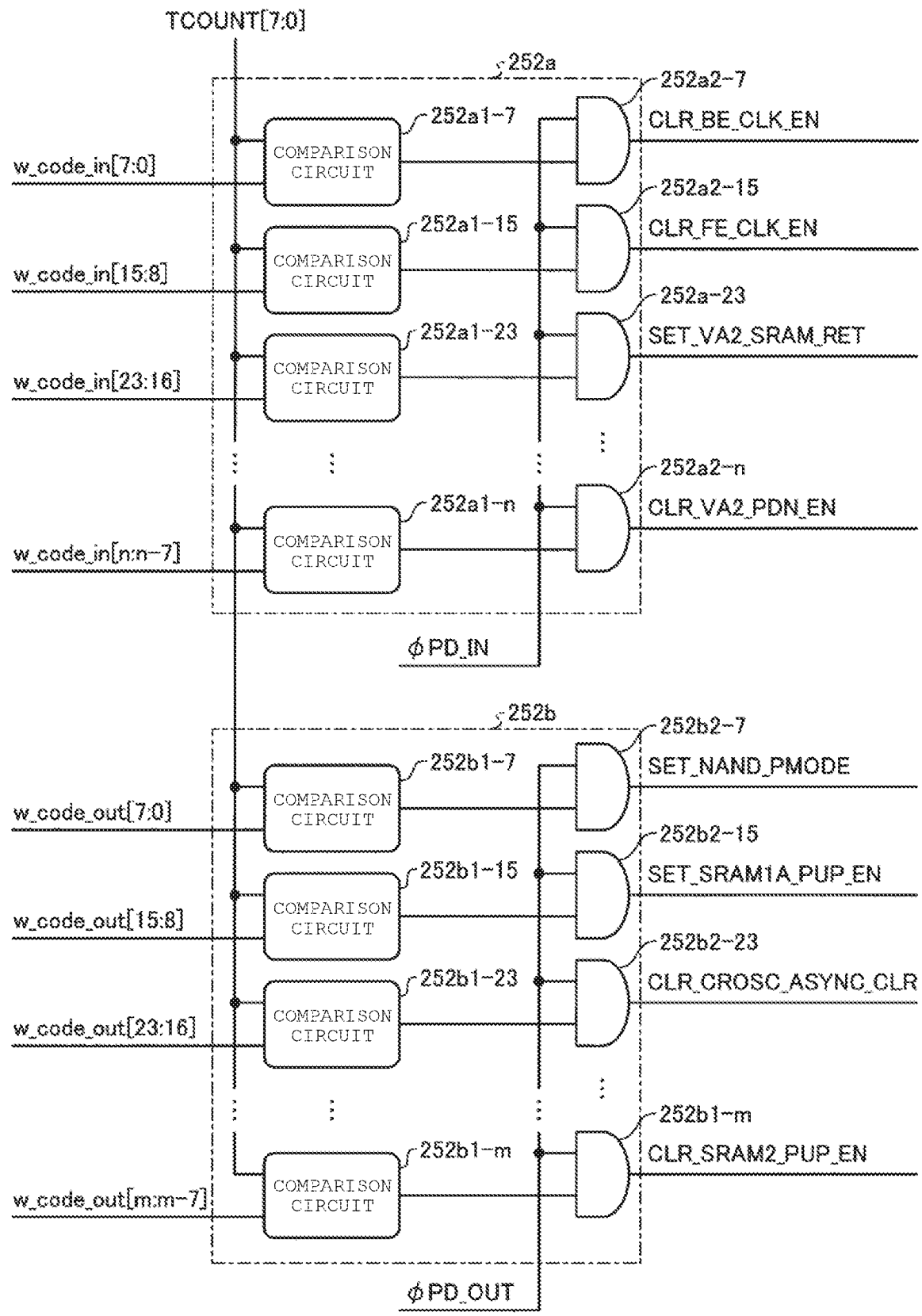
FIG. 4 is a diagram illustrating a configuration of a comparison circuit group in the embodiment.

The state decoder 252c decodes the state signal STATE received from the state machine 251, so as to generate a power up signal ϕPU, a power down signal ϕPD_IN, and a wake-up signal φPD_OUT. The state decoder 252c supplies the power up signal φPU to the selector circuit 252d, supplies the power down signal φPD_IN to the comparison circuit group 252a, and supplies the wake-up signal φPD_OUT to the comparison circuit group 252b. As illustrated in FIG. 4, the comparison circuit group 252a includes a plurality of comparison circuits 252a1-7, 252a1-15, . . . , and 252a1-n, and a plurality of logical product calculation circuits 252a2-7, 252a2-15, . . . , and 252a2-n.

Figure 5:
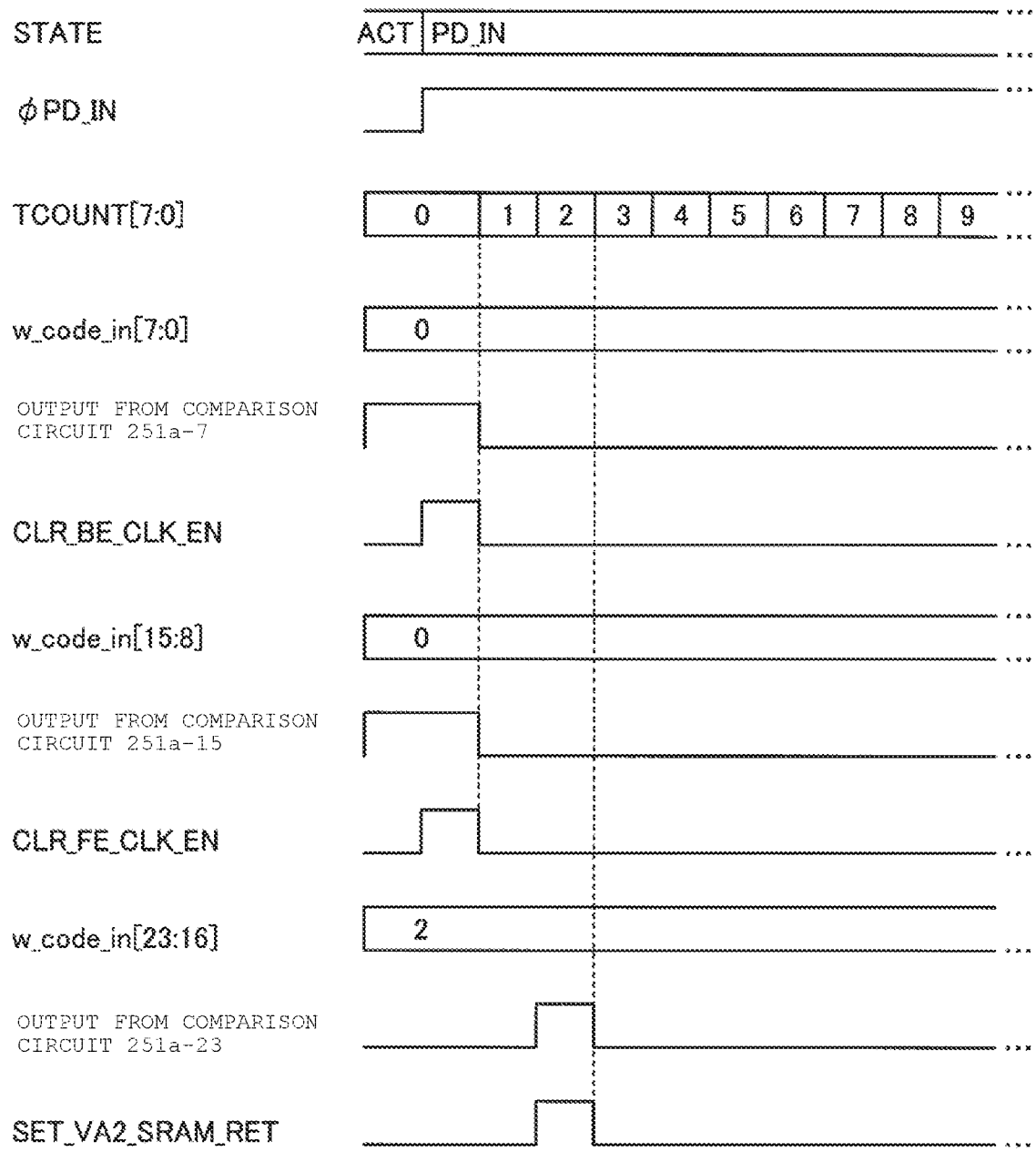
FIG. 5 is a waveform diagram illustrating an operation of the comparison circuit group in the embodiment.

For example, as illustrated in FIG. 5, when the state signal STATE is changed from ACT (that is, an active state) to PD_IN (that is, a power down process corresponding to transitioning to a power down state), the timing counter 251a starts a count operation, and thus the timing count value TCOUNT is counted up periodically (in a predetermined clock cycle) from zero.

In a case where the state signal STATE is changed from ACT to PD_IN, the state decoder 252c changes the power down signal φPD_IN from a non-active level (that is, "0") to an active level (that is, "1"). Consequently, the logical product calculation circuits 252a2-7, 252a2-15, . . . , and 252a2-n respectively enable comparison results in the comparison circuits 252a1-7, 252a1-15, . . . , and 252a1-n to be output to the generation circuit 253. In a case where the power down signal φPD_IN is brought into a non-active level (that is, "0"), the respective logical product calculation circuits 252a2-7, 252a2-15, . . . , and 252a2-n fix the outputs thereof to "0".

Since each piece of timing information indicates a timing count value at which a pulse is to be output, each comparison circuit 252a1 compares the timing information with the timing count value TCOUNT, changes a pulse of a comparison result from a non-active level (that is, "0") to an active level (that is, "1") in a case where the timing information matches the timing count value TCOUNT, and causes a pulse of a comparison result to be changed from an active level to a non-active level in a case where the timing information does not match the timing count value TCOUNT.

The comparison circuit 252a1-7 compares timing information w_code_in[7:0] of a power source control function CLR_BE_CLK_EN with the timing count value TCOUNT[7:0]. In a case where the timing information w_code_in[7:0] is "0", the comparison circuit 252a1-7 outputs "1" as a comparison result in a period of the timing count value TCOUNT=0, and a logical product of this output and the power down signal φPD_IN is calculated by the logical product calculation circuit 252a2-7 and then supplied as a clear pulse CLR_BE_CLK_EN (refer to FIG. 8) to the generation circuit 253.

The comparison circuit 252a1-15 compares timing information w_code_in[15:8] of a power source control function CLR_FE_CLK_EN with the timing count value TCOUNT[7:0]. In a case where the timing information w_code_in[15:8] is "0", the comparison circuit 252a1-15 outputs "1" as a comparison result in a period of the timing count value TCOUNT=0, and a logical product of this output and the power down signal φPD_IN is calculated by the logical product calculation circuit 252a2-15 and then supplied as a clear pulse CLR_FE_CLK_EN (refer to FIG. 8) to the generation circuit 253.

The comparison circuit 252a1-23 compares timing information w_code_in[23:16] of a power source control function SET_VA2_SRAM_RET with the timing count value TCOUNT[7:0]. In a case where the timing information w_code_in[23:16] is "2", the comparison circuit 252a1-23 outputs "1" as a comparison result in a period of the timing count value TCOUNT=2, and a logical product of this output and the power down signal φPD_IN is calculated by the logical product calculation circuit 252a2-23 and then supplied as a set pulse SET_VA2_SRAM_RET (refer to FIG. 8) to the generation circuit 253.

As illustrated in FIG. 4, the comparison circuit group 252b includes a plurality of comparison circuits 252b1-7, 252b1-15, . . . , and 252b1-m, and a plurality of logical product calculation circuits 252b2-7, 252b2-15, . . . , and 252b2-m.

Figure 6:
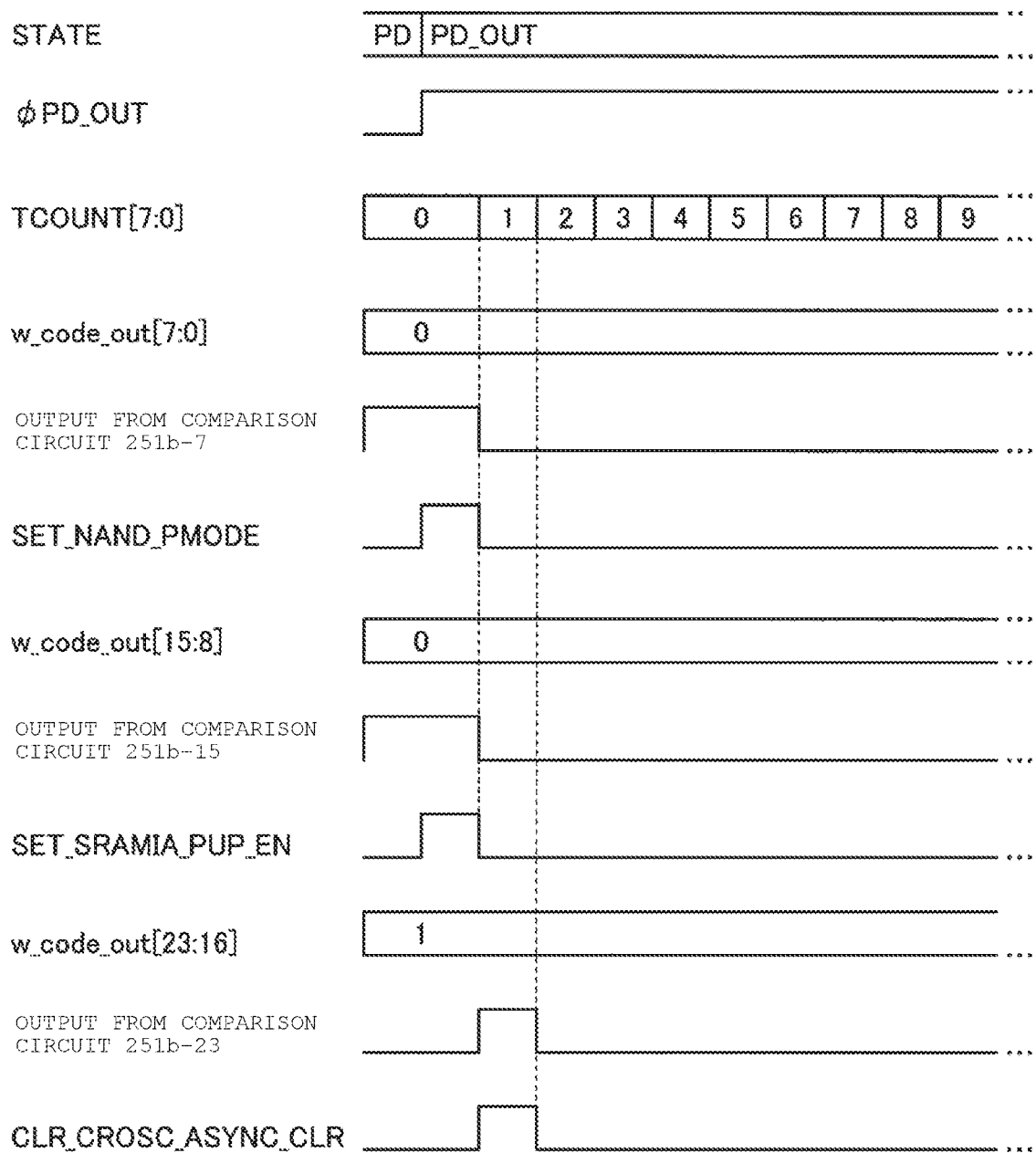
FIG. 6 is a waveform diagram illustrating an operation of the comparison circuit group in the embodiment.

For example, as illustrated in FIG. 6, when the state signal STATE is changed from PD (that is, a power down state) to PD_OUT (that is, a wake-up process corresponding to transitioning to an active state), the timing counter 251a starts a count operation, and thus the timing count value TCOUNT is counted up periodically (in a predetermined clock cycle) from zero.

When the state signal STATE is changed from PD to PD_OUT, the state decoder 252c changes the wake-up signal φPD_OUT from a non-active level (that is, "0") to an active level (that is, "1"). Consequently, the logical product calculation circuits 252b2-7, 252b2-15, . . . , and 252b2-m respectively enable comparison results in the comparison circuits 252b1-7, 252b1-15, . . . , and 252b1-m to be output to the generation circuit 253. In a case where the wake-up signal PD_OUT is brought into a non-active level (that is, "0"), the respective logical product calculation circuits 252b2-7, 252b2-15, . . . , and 252b2-m fix the outputs thereof to "0".

Since each piece of timing information indicates a timing count value at which a pulse is to be output, each comparison circuit 252b1 compares the timing information with the timing count value TCOUNT, changes a pulse of a comparison result from a non-active level (that is, "0") to an active level (that is, "1") in a case where the timing information matches the timing count value TCOUNT, and causes a pulse of a comparison result to be changed from an active level to a non-active level in a case where the timing information does not match the timing count value TCOUNT.

The comparison circuit 252b1-7 compares timing information w_code_out[7:0] of a power source control function SET_NAND_PMODE with the timing count value TCOUNT[7:0]. In a case where the timing information w_code_out[7:0] is "0", the comparison circuit 252b1-7 outputs "1" as a comparison result in a period of the timing count value TCOUNT=0, and a logical product of this output and the power down signal φPD_IN is calculated by the logical product calculation circuit 252b2-7 and then supplied as a set pulse SET_NAND_PMODE (refer to FIG. 11) to the generation circuit 253.

The comparison circuit 252b1-15 compares timing information w_code_out[15:8] of a power source control function SET_SRAM1A_PUP_EN with the timing count value TCOUNT[7:0]. In a case where the timing information w_code_out[15:8] is "0", the comparison circuit 252b1-15 outputs "1" as a comparison result in a period of the timing count value TCOUNT=0, and a logical product of this output and the power down signal φPD_IN is calculated by the logical product calculation circuit 252b2-15 and then supplied as a set pulse SET_SRAM1A_PUP_EN (refer to FIG. 11) to the generation circuit 253.

The comparison circuit 252b1-23 compares timing information w_code_out[23:16] of a power source control function CLR_CROSC_ASYNC_CLR with the timing count value TCOUNT[7:0]. In a case where the timing information w_code_out[23:16] is "1", the comparison circuit 252b1-23 outputs "1" as a comparison result in a period of the timing count value TCOUNT=1, and a logical product of this output and the power down signal ϕPD_IN is calculated by the logical product calculation circuit 252b2-23 and then supplied as a clear pulse CLR_CROSC_ASYNC_CLR (refer to FIG. 11) to the generation circuit 253.

Refer to FIG. 2. The selector circuit 252d receives the power up signal ϕPU from the state decoder 252c. The selector circuit 252d selects and connects the circuit 252e to the comparison circuit group 252b in a period in which the power up signal ϕPU is at an active level, and selects and connects the storage circuit 24 to the comparison circuit group 252b in a period in which the power up signal ϕPU is at a non-active level.

The comparison circuit group 252a receives the timing count value TCOUNT from the state machine 251, receives the power down signal ϕPD_IN from the state decoder 252c, and receives the timing information group from the storage circuit 24. The comparison circuit group 252a compares the timing count value TCOUNT with the timing information group. The comparison circuit group 252a supplies a comparison result to the generation circuit 253 in a period in which the power down signal ϕPD_IN is at an active level, and does not supply the comparison result to the generation circuit 253 in a period in which the power down signal ϕPD_IN is at a non-active level.

The plurality of comparison circuits 252a1-7 to 252a1-n respectively correspond to a plurality of pieces of timing information in the bit group BG11 and the bit group BG21. Each comparison circuit 252a1 includes the same number of comparison circuits as the number of bits (for example, 8 bits) corresponding to timing information. Each comparison circuit 252a1 receives the timing count value TCOUNT from the state machine 251, receives corresponding timing information from the storage circuit 24, and outputs a pulse (a logical value of "1") as a comparison result at a timing at which the timing information matches the timing count value TCOUNT.

The plurality of logical product calculation circuits 252a2-7 to 252a2-n respectively correspond to the plurality of comparison circuits 252a1-7 to 252a1-n. Each logical product calculation circuit 252a2 receives a comparison result from the corresponding comparison circuit 252a1, receives the power down signal ϕPD_IN from the state decoder 252c, calculates a logical product of the comparison result and the power down signal ϕPD_IN, and supplies a calculation result to the generation circuit 253. In other words, each logical product calculation circuit 252a2 functions as a gate through which a comparison result of the corresponding comparison circuit 252a1 passes only in a period in which the power down signal ϕPD_IN is at an active level and the comparison result of the corresponding comparison circuit 252a1 does not pass in a period in which the power down signal ϕPD_IN is at a non-active level. Outputs from the plurality of logical product calculation circuits 252a2-7 to 252a2-n include a clear pulse CLR or a set pulse SET.

The comparison circuit group 252b illustrated in FIG. 2 receives the timing count value TCOUNT from the state machine 251, receives the wake-up signal ϕPD_OUT from the state decoder 252c, and receives a timing information group from the selector circuit 252d. The comparison circuit group 252b compares the timing count value TCOUNT with the timing information group. The comparison circuit group 252b supplies a comparison result to the generation circuit 253 in a period in which the wake-up signal ϕPD_OUT is at an active level, and does not supply the comparison result to the generation circuit 253 in a period in which the wake-up signal ϕPD_OUT is at a non-active level.

For example, as illustrated in FIG. 4, the comparison circuit group 252b includes a plurality of comparison circuits 252b1-7, 252b1-15, . . . , and 252b1-m, and a plurality of logical product calculation circuits 252b2-7, 252b2-15, . . . , and 252b2-m.

The plurality of comparison circuits 252b1-7 to 252b1-m respectively correspond to a plurality of pieces of timing information in the bit group BG12 and the bit group BG22. Each comparison circuit 252b1 includes the same number of comparison circuits as the number of bits (for example, 8 bits) corresponding to timing information. Each comparison circuit 252b1 receives the timing count value TCOUNT from the state machine 251, receives corresponding timing information from the selector circuit 252d, and outputs a pulse (a logical value of "1") as a comparison result at a timing at which the timing information matches the timing count value TCOUNT.

The plurality of logical product calculation circuits 252b2-7 to 252b2-m respectively correspond to the plurality of comparison circuits 252b1-7 to 252b1-m. Each logical product calculation circuit 252b2 receives a comparison result from the corresponding comparison circuit 252b1, receives the wake-up signal PD_OUT from the state decoder 252c, calculates a logical product of the comparison result and the wake-up signal ϕPD_OUT, and supplies a calculation result to the generation circuit 253. In other words, each logical product calculation circuit 252b2 functions as a gate through which a comparison result of the corresponding comparison circuit 252b1 passes only in a period in which the wake-up signal ϕPD_OUT is at an active level, and the comparison result of the corresponding comparison circuit 252b1 does not pass in a period in which the wake-up signal ϕPD_OUT is at a non-active level. Outputs from the plurality of logical product calculation circuits 252b2-7 to 252b2-m include a clear pulse CLR or a set pulse SET.

The generation circuit 253 illustrated in FIG. 1 generates a plurality of power source control signals corresponding to a plurality of power source control functions according to the comparison results of the comparison circuit group 252a and the comparison circuit group 252b. The generation circuit 253 supplies the plurality of power source control signals to the power source related circuits 26.

The power source related circuits 26 include circuits related to power source control, and include, for example, a reset circuit 261, a clock generation circuit 262, an analog IP circuit 263, and a power source switch 264. The plurality of power source control signals may include control signals for the reset circuit 261, the clock generation circuit 262, the analog IP circuit 263, and the power source switch 264.

For example, as illustrated in FIG. 2, the generation circuit 253 includes a flip-flop 253a corresponding to the reset circuit 261, a flip-flop 253b corresponding to the clock generation circuit 262, a flip-flop 253c corresponding to the analog IP circuit 263, and a flip-flop 253d corresponding to the power source switch 264.

The flip-flop 253a changes a power source control signal from an active level to a non-active level in response to reception of the clear pulse CLR from the comparison circuit group 252a or the comparison circuit group 252b, and changes a power source control signal from a non-active level to an active level in response to reception of the set pulse SET from the comparison circuit group 252a or the comparison circuit group 252b. The flip-flop 253a supplies the power source control signal to the reset circuit 261.

The flip-flop 253b changes a power source control signal from an active level to a non-active level in response to reception of the clear pulse CLR from the comparison circuit group 252a or the comparison circuit group 252b, and changes a power source control signal from a non-active level to an active level in response to reception of the set pulse SET from the comparison circuit group 252a or the comparison circuit group 252b. The flip-flop 253b supplies the power source control signal to the clock generation circuit 262.

The flip-flop 253c changes a power source control signal from an active level to a non-active level in response to reception of the clear pulse CLR from the comparison circuit group 252a or the comparison circuit group 252b, and changes a power source control signal from a non-active level to an active level in response to reception of the set pulse SET from the comparison circuit group 252a or the comparison circuit group 252b. The flip-flop 253c supplies the power source control signal to the analog IP circuit 263.

The flip-flop 253d changes a power source control signal from an active level to a non-active level in response to reception of the clear pulse CLR from the comparison circuit group 252a or the comparison circuit group 252b, and changes a power source control signal from a non-active level to an active level in response to reception of the set pulse SET from the comparison circuit group 252a or the comparison circuit group 252b. The flip-flop 253d supplies the power source control signal to the power source switch 264.

In a case where the reset circuit 261, each of the clock generation circuit 262, the analog IP circuit 263, and the power source switch 264 is controlled by a plurality of flip-flops, the generation circuit 253 includes a plurality of flip-flops 253a, a plurality of flip-flops 253b, a plurality of flip-flops 253c, and a plurality of flip-flops 253d.

Figure 7:
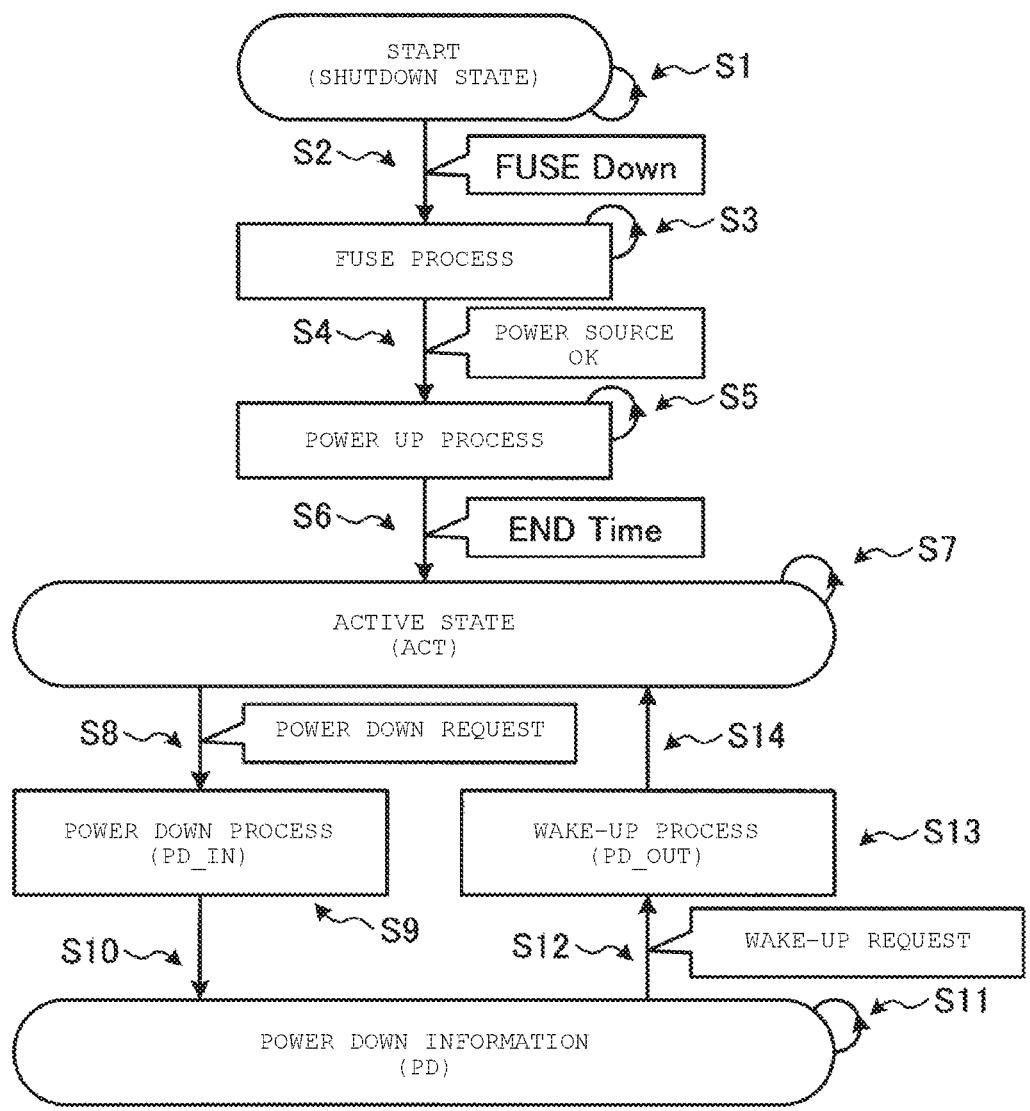
FIG. 7 is a state transition diagram illustrating an operation of the memory system according to the embodiment.

Next, with reference to FIG. 7, an operation of the memory system 1 will be described. FIG. 7 is a state transition diagram illustrating an operation of the memory system 1.

In a shutdown state, the memory system 1 waits for a start-up request to be received from the host HA (S1). In a case where the start-up request is received from the host HA (S2), the memory system 1 starts up the processor 21. After the processor 21 is started up, the memory system 1 determines that a timing for starting a fuse process has been reached (FUSE Down), allows the processor 21 to start the fuse process including reading the management information 11a from the management information storage region (also referred to as a fuse region) 11 and performing initial setting using the management information 11a, and waits for the fuse process to be completed (S3). In other words, the processor 21 operates the low frequency oscillator 27 during the start-up to generate a low-speed clock, operates the memory interface 23 at the low-speed clock, and reads the management information 11a from the management information storage region 11 of the nonvolatile memory 10 via the memory interface 23. The processor 21 performs various initial setting operations by using the management information 11a. For example, the processor 21 may access the circuit 241 of the storage circuit 24, and may store a timing information group in the management information 11a into the circuit 241. The processor 21 may generate a power-save-mode designation signal according to the management information 11a, and supply the power-save-mode designation signal to the selector circuit 243 of the storage circuit 24.

Upon the fuse process having been completed by the processor 21 (S4), and power is supplied to a predetermined power source region (that is, the power source region is turned on) which is in a power down state, the memory system 1 causes the power source control circuit 25 to start a power up process, and waits for the power up process to be completed (S5). The power up process is a process for transitioning from a shutdown state to an active state. Upon the power up process being started, the state machine 251 generates the state signal STATE indicating the transitioning from the shutdown state to the active state, and supplies the state signal STATE to the decode circuit 252. The decode circuit 252 decodes the state signal STATE so as to bring the power up signal φPU and the wake-up signal φPD_OUT into an active level. Consequently, a predetermined clear pulse CLR and/or a predetermined set pulse SET is supplied from the decode circuit 252 to the generation circuit 253, and thus a plurality of power source control signals corresponding to the power up process are supplied from the generation circuit 253 to the power source related circuits 26.

Upon the power up process having been completed by the power source control circuit 25 (S6), and a start-up process time has elapsed (that is, END Time comes), the memory system 1 notifies the state machine 251 that it is in an active state, and waits for a power down request to be received from the host HA (S7).

In a case where the power down request is received from the host HA (S8), the memory system 1 performs a power down process on a predetermined power source region (S9).

FIG. 8 is a diagram illustrating an example of timing information for the power down process, and illustrates, for example, each piece of timing information in the timing information group INF2_RY2 for a power save mode "PM_RY2" and each piece of timing information in the timing information group INF1_PRG0 for a power save mode "PM_PRG0". For example, in a case where the power-save-mode designation signal is PM_RY2, the decode circuit 252 may receive a plurality of pieces of timing information in the timing information group INF2_RY2 as illustrated in FIG. 8 in parallel to each other from the storage circuit 24, perform decode processes on the plurality of pieces of timing information in parallel, and supply the decoded results to the generation circuit 253 in parallel. The generation circuit 253 generates power source control signals corresponding to a plurality of power source control functions according to the comparison results of the comparison circuit group 252a. The generation circuit 253 supplies the plurality of power source control signals to the power source related circuits 26.

Figure 9:
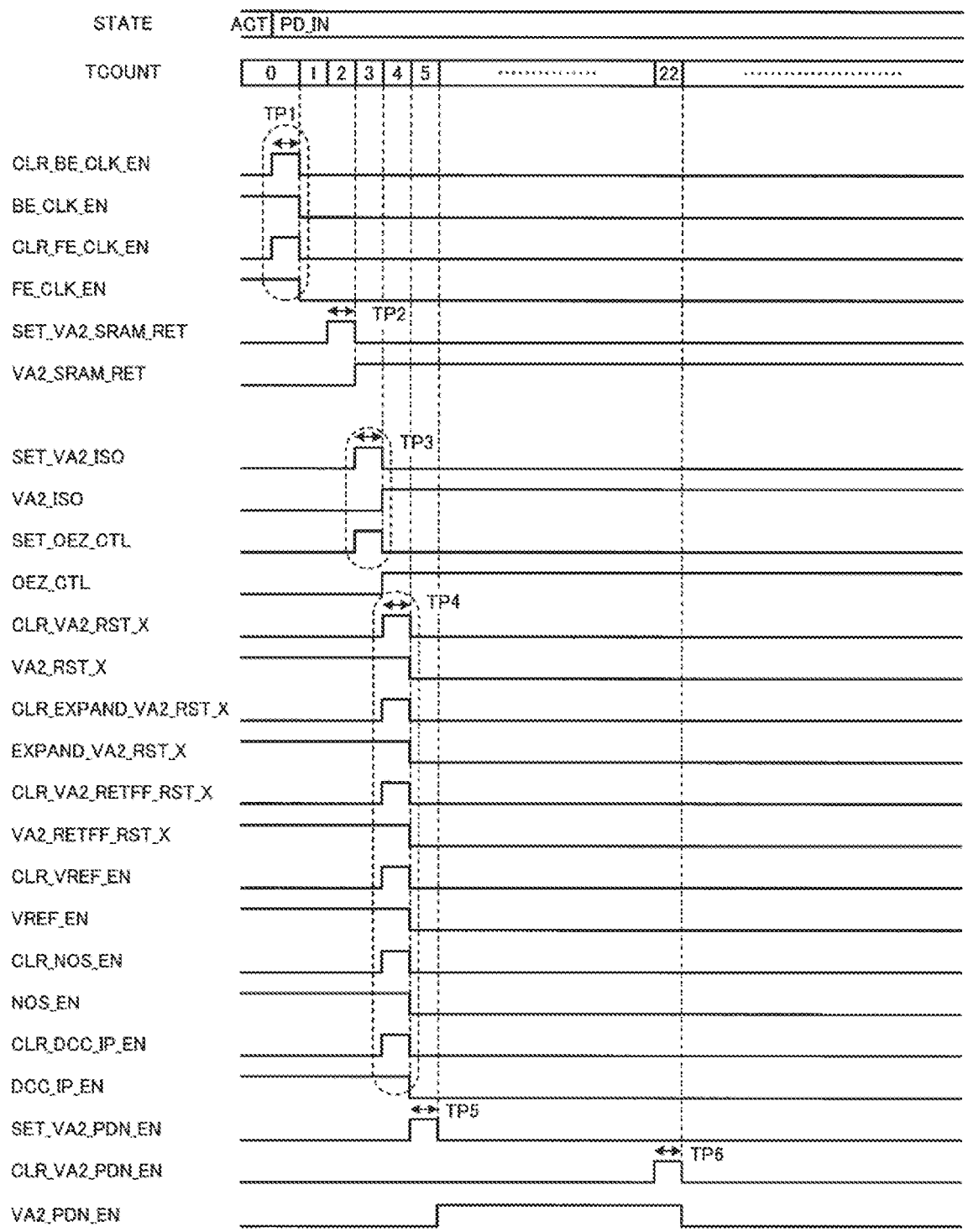
FIG. 9 is a waveform diagram illustrating a power down process according to a first power save mode implemented in the memory system according to the embodiment.

Specifically, since timing information of the power source control function CLR_BE_CLK_EN and timing information of the power source control function CLR_FE_CLK_EN are "0" (refer to FIG. 8), the clear pulse CLR_BE_CLK_EN and the clear pulse CLR_FE_CLK_EN are asserted in a period TP1 in which STATE=PD_IN and TCOUNT=0 as illustrated in FIG. 9, and thus a power source control signal BE_CLK_EN and a power source control signal FE_CLK_EN are changed from an active level to a non-active level and then supplied to the power source related circuits 26. FIG. 9 is a waveform diagram illustrating a power down process in a case where the power save mode "RY2" is designated. The clock generation circuit 262 generates a clock BE_CLK when the power source control signal BE_CLK_EN is at an active level, and stops generation of the clock BE_CLK when the power source control signal BE_CLK_EN is at a non-active level. The clock generation circuit 262 generates a clock FE_CLK when the power source control signal FE_CLK_EN is at an active level, and stops generation of the clock FE_CLK in a period in which the power source control signal FE_CLK_EN is at a non-active level.

Since timing information of a power source control function SET_VA2_SRAM_RET is "2" (refer to FIG. 8), the set pulse SET_VA2_SRAM_RET is asserted in a period TP2 in which STATE=PD_IN and TCOUNT=2, and thus a power source control signal VA2_SRAM_RET is changed from a non-active level to an active level and then supplied to the power source related circuits 26. The analog IP circuit 263 generates a RET signal VA2_SRAM for an SRAM when the power source control signal VA2_SRAM_RET is at an active level, and stops generation of the RET signal VA2_SRAM for an SRAM when the power source control signal VA2_SRAM_RET is at a non-active level.

Since timing information of a power source control function SET_VA2_ISO and timing information of a power source control function SET_OEZ_CTL are "3" (refer to FIG. 8), a set pulse SET_VA2_ISO and a set pulse SET_OEZ_CTL are asserted in a period TP3 in which STATE=PD_IN and TCOUNT=3, and thus a power source control signal VA2_ISO and a power source control signal OEZ_CTL are changed from a non-active level to an active level and then supplied to the power source related circuits 26. The analog IP circuit 263 generates an isolation signal VA2 when the power source control signal VA2_ISO is at an active level, and stops generation of the isolation signal VA2 when the power source control signal VA2_ISO is at a non-active level. The analog IP circuit 263 generates a control signal OEZ when the power source control signal OEZ_CTL is at an active level, and stops generation of the control signal OEZ when the power source control signal OEZ_CTL is at a non-active level.

Since timing information of a power source control function CLR_VA2_RST_X, timing information of a power source control function CLR_EXPAND_VA2_RST_X, timing information of a power source control function CLR_VA2_RETFF_RST_X, timing information of a power source control function CLR_VREF_EN, timing information of a power source control function CLR_NOS_EN, and timing information of a power source control function CLR_DCC_IP_EN are "4" (refer to FIG. 8), a clear pulse CLR_VA2_RST_X, a clear pulse CLR_EXPAND_VA2_RST_X, a clear pulse CLR_VA2_RETFF_RST_X, and a clear pulse CLR_VREF_EN, a clear pulse CLR_NOS_EN, and a clear pulse CLR_DCC_IP_EN are asserted in a period TP4 in which STATE=PD_IN and TCOUNT=4, and thus a power source control signal VA2_RST_X, a power source control signal EXPAND_VA2_RST_X, a power source control signal VA2_RETFF_RST_X, a power source control signal VREF_EN, a power source control signal NOS_EN, and a power source control signal DCC_IP_EN are changed from an active level to a non-active level and then supplied to the power source related circuits 26.

The reset circuit 261 generates reset signals VA2_RST_X, EXPAND_VA2_RST_X, and VA2_RETFF_RST when the power source control signals VA2_RST_X, EXPAND_VA2_RST_X, and VA2_RETFF_RST_X are at an active level, and stops generation of the reset signals VA2_RST_X, EXPAND_VA2_RST_X, and VA2_RETFF_RST when the power source control signals VA2_RST_X, EXPAND_VA2_RST_X, and VA2_RETFF_RST_X are at a non-active level.

Since timing information of a power source control function SET_VA2_PDN_EN is "5" (refer to FIG. 8), a set pulse SET_VA2_PDN_EN is asserted in a period TP5 in which STATE=PD_IN and TCOUNT=5, and thus a power source control signal VA2_PDN_EN is changed from a non-active level to an active level and then supplied to the power source related circuits 26. The analog IP circuit 263 generates an enable signal VA2_PDN_EN when the power source control signal VA2_PDN_EN is at an active level, and stops generation of the enable signal VA2_PDN_EN when the power source control signal VA2_PDN_EN is at a non-active level.

Since timing information of a power source control function CLR_VA2_PDN_EN is "22" (refer to FIG. 8), a clear pulse CLR_VA2_PDN_EN is asserted in a period TP6 in which STATE=PD_IN and TCOUNT=22, and thus the power source control signal VA2_PDN_EN is changed from an active level to a non-active level and then supplied to the power source related circuits 26.

Regarding a relationship among the isolation signal VA2, the reset signal VA2_RST_X, and the power source control signal VA2_PDN_EN, the isolation signal VA2 becomes active (ON), the reset signal VA2_RST_X and the reset signal EXPAND_VA2_RST_X are asserted (Low), and, finally, a power source of a VA2 region is turned off by the power source control signal VA2_PDN_EN.

As illustrated in FIG. 9, since the pulses surrounded by dashed lines are asserted in parallel, a plurality of power source control functions can be executed in parallel to each other, and thus the power down process can be performed at a high speed.

Alternatively, for example, in a case where a power-save-mode designation signal is PM_PRG0, the decode circuit 252 may receive a plurality of pieces of timing information in the timing information group INF1_PRG0 as illustrated in FIG. 8 in parallel to each other from the storage circuit 24, perform decode processes on the plurality of pieces of timing information in parallel, and supply the decoded results to the generation circuit 253 in parallel. The generation circuit 253 generates power source control signals corresponding to a plurality of power source control functions according to the comparison results of the comparison circuit group 252a. The generation circuit 253 supplies the plurality of power source control signals to the power source related circuits 26.

Figure 10:
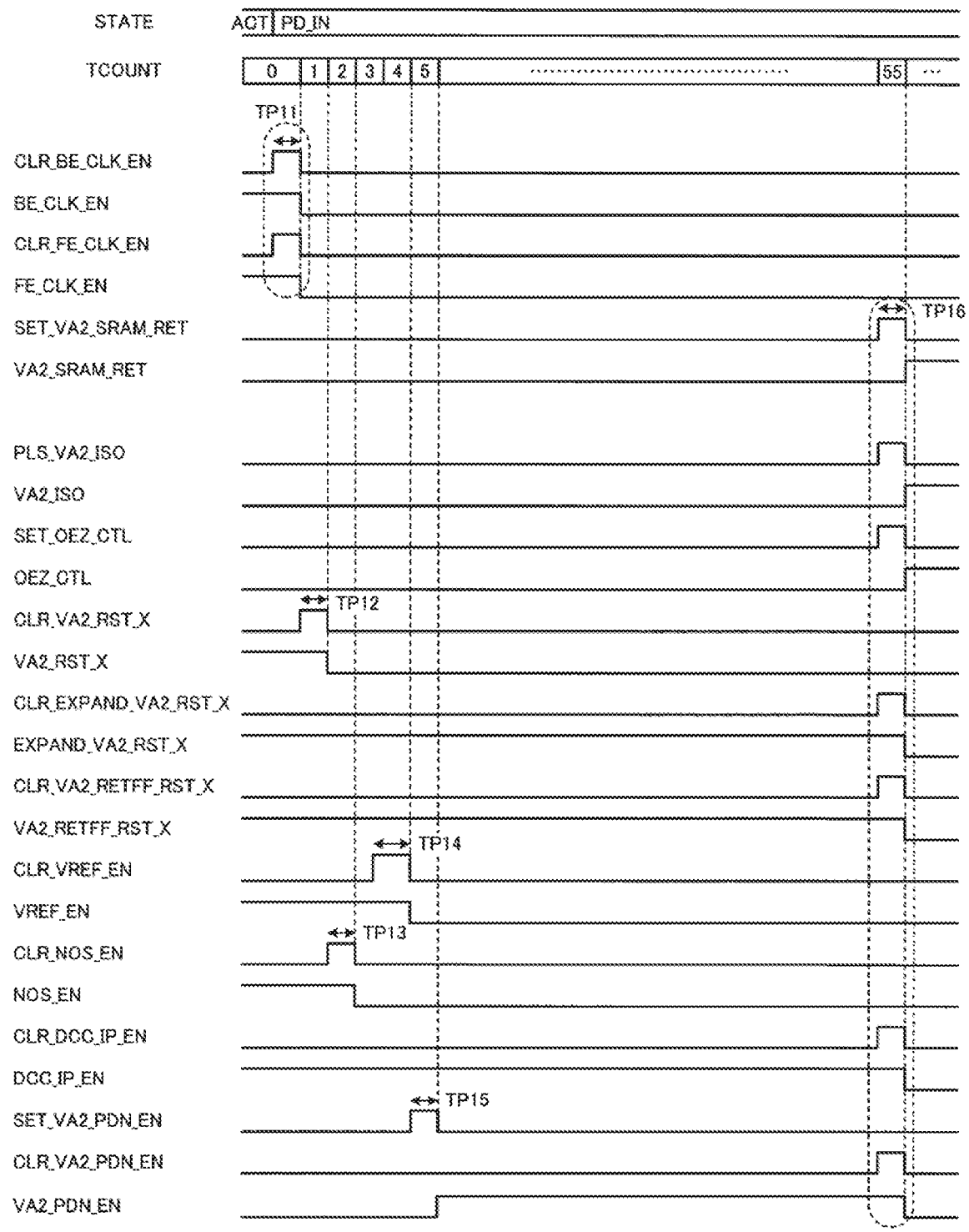
FIG. 10 is a waveform diagram illustrating a power down process according to a second power save mode implemented in the memory system according to the embodiment.

Specifically, since timing information of the power source control function CLR_BE_CLK_EN and timing information of the power source control function CLR_FE_CLK_EN are "0" (refer to FIG. 8), the clear pulse CLR_BE_CLK_EN and the clear pulse CLR_FE_CLK_EN are asserted in a period TP11 in which STATE=PD_IN and TCOUNT=0 as illustrated in FIG. 10, and thus the power source control signal BE_CLK_EN and the power source control signal FE_CLK_EN are changed from an active level to a non-active level and then supplied to the power source related circuits 26. FIG. 10 is a waveform diagram illustrating a power down process in a case where the power save mode "PM_PRG0" is designated.

Since timing information of a power source control function CLR_VA2_RST_X is "1" (refer to FIG. 8), the clear pulse CLR_VA2_RST_X is asserted in a period TP12 in which STATE=PD_IN and TCOUNT=1, and thus the power source control signal VA2_RST_X are changed from an active level to a non-active level and then supplied to the power source related circuits 26.

Since timing information of a power source control function CLR_NOS_EN is "2" (refer to FIG. 8), the clear pulse CLR_NOS_EN is asserted in a period TP13 in which STATE=PD_IN and TCOUNT=2, and thus a power source control signal NOS_EN are changed from an active level to a non-active level and then supplied to the power source related circuits 26.

Since timing information of a power source control function CLR_VREF_EN is "4" (refer to FIG. 8), the clear pulse CLR_VREF_EN is asserted in a period TP14 in which STATE=PD_IN and TCOUNT=4, and thus a power source control signal VREF_EN is changed from an active level to a non-active level and then supplied to the power source related circuits 26.

Since timing information of the power source control function SET_VA2_PDN_EN is "5" (refer to FIG. 8), the set pulse SET_VA2_PDN_EN is asserted in a period TP15 in which STATE=PD_IN and TCOUNT=5, and thus the power source control signal VA2_PDN_EN is changed from a non-active level to an active level and then supplied to the power source related circuits 26.

Since timing information of the power source control function SET_VA2_SRAM_RET, timing information of the power source control function PLS_VA2_RETFF_SAVE, timing information of the power source control function SET_VA2_ISO, timing information of the power source control function SET_OEZ_CTL, timing information of the power source control function CLR_EXPAND_VA2_RST_X, timing information of the power source control function CLR_VA2_RETFF_RST_X, timing information of the power source control function CLR_DOC_IP_EN, timing information of the power source control function CLR_VA2_PDN_EN are "55" (refer to FIG. 8), the set pulse SET_VA2_SRAM_RET, the pulse PLS_VA2_RETFF_SAVE, the set pulse SET_VA2_ISO, and the set pulse SET_OEZ_CTL rise, and the clear pulse CLR_EXPAND_VA2_RST_X, the clear pulse CLR_VA2_RETFF_RST_X, the clear pulse CLR_DOC_IP_EN, and the clear pulse CLR_VA2_PDN_EN also are asserted, in a period TP16 in which in which STATE=PD_IN and TCOUNT=55. Thus, the power source control signal VA2_SRAM_RET, the power source control signal VA2_ISO, and the power source control signal OEZ_CTL are changed from a non-active level to an active level and then supplied to the power source related circuits 26, and the power source control signal EXPAND_VA2_RST_X, the power source control signal VA2_RETFF_RST_X, the power source control signal DOC_IP_EN, and the power source control signal VA2_PDN_EN are changed from an active level to a non-active level and then supplied to the power source related circuits 26.

As illustrated in FIG. 10, since the pulses surrounded by dashed lines is asserted in parallel, a plurality of power source control functions can be executed in parallel to each other, and thus the power down process can be performed at a high speed. A power down process different from that in FIG. 9 may be performed according to a timing information group which is set in a rewritable manner.

Refer to FIG. 7 again. In a case where the power down process is completed by the storage circuit 24 and the power source control circuit 25 (S10), the memory system 1 notifies the state machine 251 of its being in the power down state, and waits for a wake-up request to be received from the host HA (S11).

In a case where the wake-up request is received from the host HA (S12), the memory system 1 performs a wake-up process (S13).

FIG. 11 is a diagram illustrating an example of timing information for a wake-up process, and illustrates, for example, each piece of timing information in the timing information group INF2_RY2 for a power save mode "PM_RY2" and each piece of timing information in the timing information group INF1_PRG0 for a power save mode "PM_PRG0". For example, in a case where the power-save-mode designation signal is PM_RY2, the decode circuit 252 may receive a plurality of pieces of timing information in the timing information group INF2_RY2 as illustrated in FIG. 11 in parallel to each other from the storage circuit 24, perform decode processes on the plurality of pieces of timing information in parallel, and supply the decoded results to the generation circuit 253 in parallel. The generation circuit 253 generates power source control signals corresponding to a plurality of power source control functions according to the comparison results of the comparison circuit group 252a. The generation circuit 253 supplies the plurality of power source control signals to the power source related circuits 26.

Figure 12:
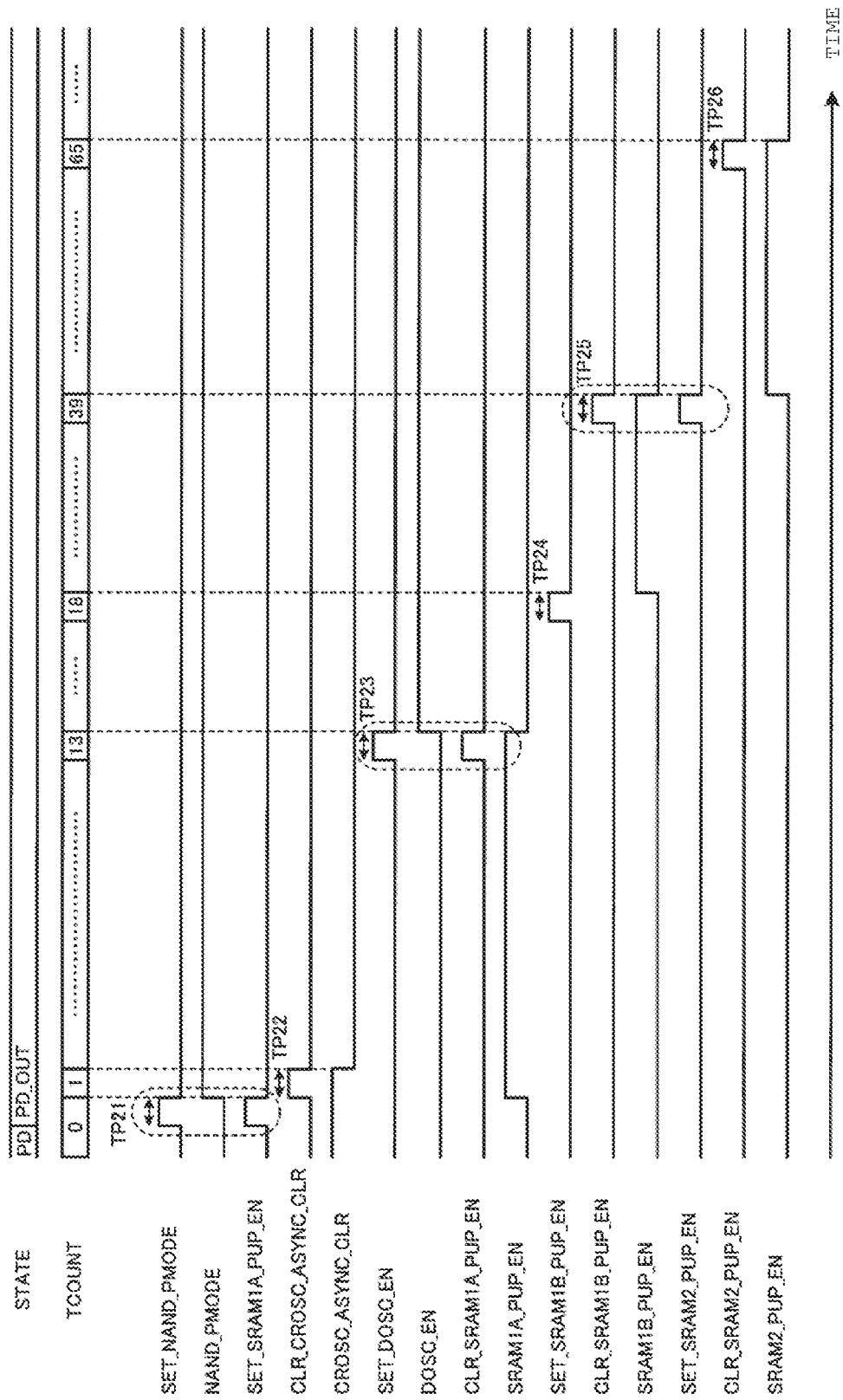
FIG. 12 is a waveform diagram illustrating a wake-up process according to the first power save mode implemented in the memory system according to the embodiment.

Specifically, since timing information of a power source control function SET_NAND_PMODE and timing information of a power source control function SET_SRAM1A_PUP_EN are "0" (refer to FIG. 11), a set pulse SET_NAND_PMODE and a set pulse SET_SRAM1A_PUP_EN are asserted in a period TP21 in which STATE=PD_OUT and TCOUNT=0 as illustrated in FIG. 12, and thus a power source control signal NAND_PMODE and a power source control signal SRAM1A_PUP_EN are changed from a non-active level to an active level and then supplied to the power source related circuits 26. FIG. 12 is a waveform diagram illustrating a wake-up process in a case where the power save mode "PM_RY2" is designated. The analog IP circuit 263 generates a control signal NAND_PMODE when the power source control signal NAND_PMODE is at an active level, and stops generation of the control signal NAND_PMODE when the power source control signal NAND_PMODE is at a non-active level. The analog IP circuit 263 generates an enable signal SRAM1A_PUP when the power source control signal SRAM1A_PUP_EN is at an active level, and stops generation of the control signal SRAM1A_PUP when the power source control signal SRAM1A_PUP_EN is at a non-active level.

Since timing information of a power source control function CLR_CROSC_ASYNC_CLR is "1" (refer to FIG. 11), a clear pulse CLR_CROSC_ASYNC_CLR is asserted in a period TP22 in which STATE=PD_OUT and TCOUNT=1, and thus a power source control signal CROSC_ASYNC_CLR is changed from an active level to a non-active level and then supplied to the power source related circuits 26. The analog IP circuit 263 generates a clear signal CROSC_ASYNC when the power source control signal CROSC_ASYNC_CLR is at an active level, and stops generation of the clear signal CROSC_ASYNC when the power source control signal CROSC_ASYNC_CLR is at a non-active level.

Since timing information of a power source control function SET_DOSC_EN and timing information of a power source control signal CLR_SRAM1A_PUP_EN are "13" (refer to FIG. 11), a set pulse SET_DOSC_EN is asserted and a clear pulse CLR_SRAM1A_PUP_EN is asserted in a period TP23 in which STATE=PD_OUT and TCOUNT=13. Thus, a power source control signal DOSC_EN is changed from a non-active level to an active level and then supplied to the power source related circuits 26, and a power source control signal SRAM1A_PUP_EN is changed from an active level to a non-active level and then supplied to the power source related circuits 26. The analog IP circuit 263 generates an enable signal DOSC when the power source control signal DOSC_EN is at an active level, and stops generation of the enable signal DOSC when the power source control signal DOSC_EN is at a non-active level.

Since timing information of a power source control function CLR_SRAM1B_PUP_EN is "18" (refer to FIG. 11), a set pulse CLR_SRAM1B_PUP_EN is asserted in a period TP24 in which STATE=PD_OUT and TCOUNT=18, and thus a power source control signal SRAM1B_PUP_EN is changed from a non-active level to an active level and then supplied to the power source related circuits 26. The analog IP circuit 263 generates an enable signal SRAM1B_PUP_EN when the power source control signal SRAM1B_PUP_EN is at an active level, and stops generation of the enable signal SRAM1B_PUP_EN when the power source control signal SRAM1B_PUP_EN is at a non-active level.

Since timing information of a power source control function CLR_SRAMlB_PUP_EN and timing information of a power source control signal SET_SRAM2_PUP_EN are "39" (refer to FIG. 11), a clear pulse CLR_SRAMlB_PUP_EN is asserted and a set pulse SET_SRAM2_PUP_EN is asserted in a period TP25 in which STATE=PD_OUT and TCOUNT=39. Thus, a power source control signal SRAM1B_PUP_EN is changed from an active level to a non-active level and then supplied to the power source related circuits 26, and a power source control signal SRAM2_PUP_EN is changed from a non-active level to an active level and then supplied to the power source related circuits 26. The analog IP circuit 263 generates an enable signal SRAM2_PUP_EN when the power source control signal SRAM2_PUP_EN is at an active level, and stops generation of the enable signal SRAM2_PUP_EN when the power source control signal SRAM2_PUP_EN is at a non-active level.

Since timing information of a power source control function CLR_SRAM2_PUP_EN is "65" (refer to FIG. 11), a set pulse CLR_SRAM2_PUP_EN is asserted in a period TP26 in which STATE=PD_OUT and TCOUNT=65, and thus a power source control signal SRAM2_PUP_EN is changed from an active level to a non-active level and then supplied to the power source related circuits 26.

As illustrated in FIG. 12, since the pulses surrounded by dashed lines are asserted in parallel, a plurality of power source control functions can be executed in parallel to each other, and thus the wake-up process can be performed at a high speed. Alternatively, for example, in a case where a power-save-mode designation signal is PM_PRG0, the decode circuit 252 may receive a plurality of pieces of timing information in the timing information group INF1_PRG0 as illustrated in FIG. 11 in parallel to each other from the storage circuit 24, perform decode processes on the plurality of pieces of timing information in parallel, and supply the decoded results to the generation circuit 253 in parallel. The generation circuit 253 generates power source control signals corresponding to a plurality of power source control functions according to the comparison results of the comparison circuit group 252a. The generation circuit 253 supplies the plurality of power source control signals to the power source related circuits 26.

Figure 13:
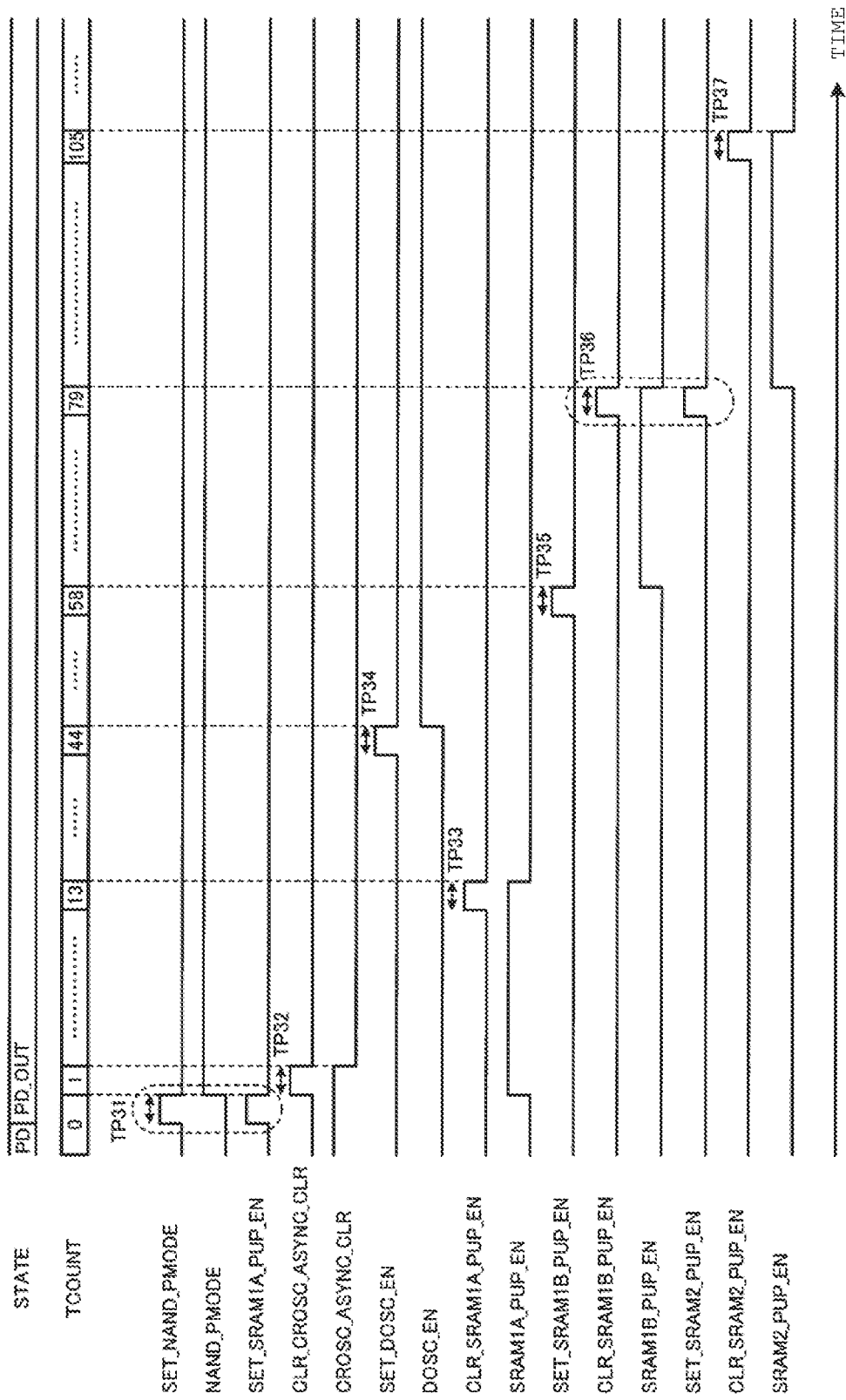
FIG. 13 is a waveform diagram illustrating a wake-up process according to the second power save mode implemented in the memory system according to the embodiment.

Specifically, since timing information of the power source control function SET_NAND_PMODE and timing information of the power source control function SET_SRAM1A_PUP_EN are "0" (refer to FIG. 11), the set pulse SET_NAND_PMODE and the set pulse SET_SRAM1A_PUP_EN are asserted in a period TP31 in which STATE=PD_OUT and TCOUNT=0 as illustrated in FIG. 13, and thus the power source control signal NAND_PMODE and the power source control signal SRAM1A_PUP_EN are changed from a non-active level to an active level and then supplied to the power source related circuits 26. FIG. 13 is a waveform diagram illustrating a wake-up process in a case where the power save mode "PM_PRG0" is designated.

Since timing information of the power source control function CLR_CROSC_ASYNC_CLR is "1" (refer to FIG. 11), the clear pulse CLR_CROSC_ASYNC_CLR is asserted in a period TP32 in which STATE=PD_OUT and TCOUNT=1, and thus the power source control signal CROSC_ASYNC_CLR is changed from an active level to a non-active level and then supplied to the power source related circuits 26.

Since timing information of the power source control signal CLR_SRAM1A_PUP_EN is "13" (refer to FIG. 11), the clear pulse CLR_SRAM1A_PUP_EN is asserted in a period TP33 in which STATE=PD_OUT and TCOUNT=13. Thus, the power source control signal SRAM1A_PUP_EN is changed from an active level to a non-active level and then supplied to the power source related circuits 26.

Since timing information of the power source control function SET_DOSC_EN is "44" (refer to FIG. 11), the set pulse SET_DOSC_EN is asserted in a period TP34 in which STATE=PD_OUT and TCOUNT=44. Thus, the power source control signal DOSC_EN is changed from a non-active level to an active level and then supplied to the power source related circuits 26.

Since timing information of the power source control function CLR_SRAMlB_PUP_EN is "58" (refer to FIG. 11), the set pulse CLR_SRAM1B_PUP_EN is asserted in a period TP35 in which STATE=PD_OUT and TCOUNT=58, and thus the power source control signal SRAM1B_PUP_EN is changed from a non-active level to an active level and then supplied to the power source related circuits 26.

Since timing information of a power source control function CLR_SRAM1B_PUP_EN and timing information of a power source control signal SET_SRAM2_PUP_EN are "79" (refer to FIG. 11), the clear pulse CLR_SRAMlB_PUP_EN is asserted and the set pulse SET_SRAM2_PUP_EN is asserted in a period TP36 in which STATE=PD_OUT and TCOUNT=79. Thus, the power source control signal SRAM1B_PUP_EN is changed from an active level to a non-active level and then supplied to the power source related circuits 26, and the power source control signal SRAM2_PUP_EN is changed from a non-active level to an active level and then supplied to the power source related circuits 26.

Since timing information of the power source control function CLR_SRAM2_PUP_EN is "105", the set pulse CLR_SRAM2_PUP_EN is asserted in a period TP37 in which STATE=PD_OUT and TCOUNT=105, and thus the power source control signal SRAM2_PUP_EN is changed from an active level to a non-active level and then supplied to the power source related circuits 26.

As illustrated in FIG. 13, since the pulses surrounded by dashed lines rise in parallel, a plurality of power source control functions can be executed in parallel to each other, and thus the wake-up process can be performed at a high speed. A wake-up process different from that in FIG. 12 may be performed according to a timing information group which is set in a rewritable manner.

Refer to FIG. 7 again. In a case where the wake-up process is completed by the storage circuit 24 and the power source control circuit 25 (S14), the memory system 1 notifies the state machine 251 of its being in the active state, and waits for a power down request to be received from the host HA (S7).

As mentioned above, in the embodiment, in the memory system 1, a timing information group can be set by simplifying a state so as to correspond to a power source state, and by providing a timing information group corresponding to a plurality of power source control functions. Consequently, a configuration and an operation of the state machine can be simplified, and thus it is possible to easily reduce the time required to verify a design of the memory system.

In the embodiment, in a case where an operation timing of a power source control function is required to be changed due to a product specification change, this can be accommodated by setting timing information, and thus it is possible to make a change of hardware unnecessary. As a result, it is possible to flexibly accommodate various product specification changes without changing hardware, and thus prevent an increase in development cost of the memory system 1.

In the memory system 1 according to the embodiment, the power source control circuit 25 can execute a plurality of power source control functions in parallel according to a plurality of pieces of timing information read from the storage circuit 24 in parallel. Consequently, compared with software execution by a processor which often does not execute a plurality of power source control functions in parallel, it is possible to improve the parallelism of a plurality of power source control functions and thus to perform, for example, a power down process or a wake-up process at a high speed. Compared with software execution by a processor which is required to execute a plurality of power source control functions by using a ROM and a RAM, it is possible to restrict a scale of an operated circuit, and thus to easily reduce power consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller configured to control the nonvolatile memory, wherein the controller includes:
a storage circuit including a plurality of rewritable storage circuits;
a processor configured to store timing data in each of the plurality of rewritable storage circuits;
a plurality of power source circuits; and
a power source control circuit configured to:
obtain the timing data from each of the plurality of rewritable storage circuits;
decode the timing data obtained from each of the plurality of rewritable storage circuits to generate a plurality of power source control signals; and
trigger parallel execution of a plurality of power source control functions by the plurality of power source circuits, respectively, according to the plurality of power source control signals.

2. The memory system according to claim 1, wherein the rewritable storage circuits are registers, wherein the storage circuit further includes a plurality of non-rewritable storage circuits that each store timing data which is not settable by the processor, and wherein the power source control circuit is further configured to trigger parallel execution of the plurality of power source control functions by the plurality of power source circuits, respectively, according to the timing data read from one of the non-rewritable storage circuits.

3. The memory system according to claim 2, wherein the storage circuit further includes a selector circuit having inputs connected to outputs of the rewritable storage circuits and outputs of the non-rewritable storage circuits, and an output connected to an input of the power source control circuit.

4. The memory system according to claim 3, wherein the selector circuit selects one of the rewritable and non-rewritable storage circuits according to a signal designating one of a plurality of power save modes.

5. The memory system according to claim 2, wherein one of the rewritable and non-rewritable storage circuits is selected according to a signal designating one of a plurality of power save modes, and wherein the power source control circuit triggers parallel execution of a plurality of first power source control functions by the plurality of power source circuits, respectively, according to the timing data read from one of the rewritable storage circuits in response to the memory system transitioning from a first power source state to a second power source state, and triggers parallel execution of a plurality of second power source control functions by the plurality of power source circuits, respectively, according to the timing data read from one of the non-rewritable storage circuits in response to the memory system transitioning from a third power source state to a fourth power source state.

6. The memory system according to claim 5, wherein each of the first power source state and the fourth power source state is an active state and each of the second power source state and the third power source state is a shutdown state.

7. The memory system according to claim 5, wherein the plurality of power source circuits include at least a reset circuit, a clock generation circuit, an analog IP circuit, and a power source switch circuit.

8. The memory system according to claim 1, wherein the power source control circuit further includes
a timing counter,
a plurality of comparison circuits that compare a count value in the timing counter with the timing data read from said one of the rewritable storage circuits, and
a generation circuit that generates a plurality of power source control signals corresponding to the plurality of power source control functions according to comparison results of the comparison circuits.

9. A method of executing power source control functions of a memory system, wherein the memory system includes a nonvolatile memory and a controller for the nonvolatile memory, the controller including a plurality of power source circuits, said method comprising:
storing timing data which is settable by the controller in a plurality of rewritable storage circuits; and
reading the timing data from one of the rewritable storage circuits, decoding the timing data to generate a plurality of power source control signals, and executing a plurality of power source control functions in parallel by the plurality of power source circuits, respectively, according to the plurality of power source control signals.

10. The method according to claim 9, wherein the rewritable storage circuits are registers, and the method further comprises:
storing timing data which is not settable by the controller in a plurality of non-rewritable storage circuits; and
reading the timing data from one of the non-rewritable storage circuits and executing the plurality of power source control functions in parallel by the plurality of power source circuits, respectively, according to the timing data that has been read.

11. The method according to claim 10, further comprising:
selecting one of the rewritable and non-rewritable storage circuits according to one of a plurality of power save modes,
wherein the timing data is read from the selected storage circuit.

12. The method according to claim 11, wherein the memory system further includes a selector circuit and a power source control circuit that triggers parallel execution of the power source control functions by the plurality of power source circuits, respectively, wherein inputs of the selector circuit are connected to outputs of the rewritable storage circuits and outputs of the non-rewritable storage circuits, and an output of the selector circuit is connected to an input of the power source control circuit.

13. The method according to claim 12, wherein the power source control circuit further includes
a timing counter,
a plurality of comparison circuits that compare a count value in the timing counter with the timing data read from the selected storage circuit, and
a generation circuit that generates a plurality of power source control signals corresponding to the plurality of power source control functions according to comparison results of the comparison circuits.

14. The method according to claim 10,
wherein one of the rewritable and non-rewritable storage circuits is selected according to one of a plurality of power save modes, and
wherein a plurality of first power source control functions are executed in parallel by the plurality of power source circuits, respectively, according to the timing data read from one of the rewritable storage circuits in response to the memory system transitioning from a first power source state to a second power source state, and a plurality of second power source control functions are executed in parallel by the plurality of power source circuits, respectively, according to the timing data read from one of the non-rewritable storage circuits in response to the memory system transitioning from a third power source state to a fourth power source state.

15. The method according to claim 14, wherein each of the first power source state and the fourth power source state is an active state and each of the second power source state and the third power source state is a shutdown state.

16. The method according to claim 14, wherein the plurality of power source circuits include at least a reset circuit, a clock generation circuit, an analog IP circuit, and a power source switch circuit in parallel.

17. The method according to claim 9, wherein the timing data is stored in the plurality of rewritable circuits by a processor of the controller, and wherein the steps of reading, decoding, and executing are performed by a power source control circuit of the controller.

* * * * *